(12) United States Patent
Choi et al.

(10) Patent No.: US 11,659,205 B2
(45) Date of Patent: *May 23, 2023

(54) METHOD OF CODING TRANSFORM COEFFICIENT BASED ON HIGH FREQUENCY ZEROING AND APPARATUS THEREOF

(71) Applicant: LG ELECTRONICS INC., Seoul (KR)

(72) Inventors: Jungah Choi, Seoul (KR); Sunmi Yoo, Seoul (KR); Jin Heo, Seoul (KR); Ling Li, Seoul (KR); Jangwon Choi, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,813

(22) Filed: Nov. 30, 2021

(65) Prior Publication Data

US 2022/0086491 A1    Mar. 17, 2022

Related U.S. Application Data

(63) Continuation of application No. 17/148,970, filed on Jan. 14, 2021, now Pat. No. 11,218,733, which is a
(Continued)

(51) Int. Cl.
*H04N 19/64* (2014.01)
*H04N 19/124* (2014.01)
(Continued)

(52) U.S. Cl.
CPC ......... *H04N 19/647* (2014.11); *H04N 19/124* (2014.11); *H04N 19/13* (2014.11);
(Continued)

(58) Field of Classification Search
CPC ........ H04N 19/13; H04N 19/91; H04N 19/18; H04N 19/176; H04N 19/70; H04N 19/136;
(Continued)

(56) References Cited

U.S. PATENT DOCUMENTS 9,357,185 B2   5/2016   Guo et al.
9,668,001 B2   5/2017   Seregin et al.
(Continued)

FOREIGN PATENT DOCUMENTS

CN    105611292 A    5/2016
CN    108632620 A    10/2018
(Continued)

OTHER PUBLICATIONS

J. Choi et al., "Non-CE7: Last position coding for large block-size transforms", Joint Video Experts Team (JVET) of ITU-T SG 16 WP 3 and ISO/IEC JTC 1/SC 29/WG 11, Jan. 9-18, 2019, JVET-M0251-v5.
(Continued)

*Primary Examiner* — Nathnael Aynalem
(74) *Attorney, Agent, or Firm* — Dentons US LLP

(57) ABSTRACT

An image decoding method performed by a decoding apparatus according to the present disclosure includes receiving a bitstream including residual information; deriving quantized transform coefficients for a current block based on the residual information included in the bitstream; deriving residual samples for the current block based on the quantized transform coefficients; and generating a reconstructed picture based on the residual samples for the current block.

14 Claims, 13 Drawing Sheets

Related U.S. Application Data continuation of application No. 16/841,062, filed on Apr. 6, 2020, now Pat. No. 10,958,939, which is a continuation of application No. PCT/KR2019/015330, filed on Nov. 12, 2019.

(60) Provisional application No. 62/792,824, filed on Jan. 15, 2019, provisional application No. 62/760,033, filed on Nov. 12, 2018.

(51) Int. Cl.
| | |
|---|---|
| *H04N 19/13* | (2014.01) |
| *H04N 19/176* | (2014.01) |
| *H04N 19/70* | (2014.01) |
| *H04N 19/91* | (2014.01) |
| *H04N 19/513* | (2014.01) |
| *H04N 19/61* | (2014.01) |

(52) U.S. Cl.
CPC ........... *H04N 19/176* (2014.11); *H04N 19/70* (2014.11); *H04N 19/91* (2014.11); *H04N 19/513* (2014.11); *H04N 19/619* (2014.11); *H04N 19/64* (2014.11)

(58) Field of Classification Search
CPC ...... H04N 19/124; H04N 19/60; H04N 19/61; H04N 19/44; H04N 19/129; H04N 19/159; H04N 19/46; H04N 19/122; H04N 19/126; H04N 19/184; H04N 19/96; H04N 19/157; H04N 19/174; H04N 19/93; H04N 19/513; H04N 19/82; H04N 19/102; H04N 19/147; H04N 19/1887; H04N 19/593; H04N 19/117; H04N 19/172; H04N 19/436; H04N 19/463; H04N 19/64; H04N 19/90; H04N 19/105; H04N 19/146; H04N 19/167; H04N 19/17; H04N 19/625; H04N 19/103; H04N 19/119; H04N 19/134; H04N 19/182; H04N 19/196; H04N 19/42; H04N 19/577; H04N 19/62; H04N 19/86; H04N 19/12; H04N 19/139; H04N 19/51; H04N 19/619; H04N 19/107; H04N 19/14; H04N 19/149; H04N 19/186; H04N 19/109; H04N 19/11; H04N 19/112; H04N 19/132; H04N 19/15; H04N 19/19; H04N 19/197; H04N 19/198; H04N 19/34; H04N 19/40; H04N 19/503; H04N 19/53; H04N 19/567; H04N 19/583; H04N 19/635; H04N 19/647; H04N 19/65; H04N 21/234363; H04N 21/2365; H04N 21/2665; H04N 21/8456; H04N 19/10; H04N 19/115; H04N 19/137; H04N 19/156; H04N 19/162; H04N 19/177; H04N 19/187; H04N 19/45; H04N 19/55; H04N 19/88
USPC ....................... 375/240.01–240.29
See application file for complete search history.

(56) References Cited

U.S. PATENT DOCUMENTS

| | | | | |
|---|---|---|---|---|
| 2013/0114676 A1* | 5/2013 | Guo | ............ | H03M 7/4018 |
| | | | | 375/240.02 |
| 2013/0114738 A1* | 5/2013 | Chien | ............ | H04N 19/18 |
| | | | | 375/240.24 |
| 2013/0188688 A1* | 7/2013 | Panusopone | ........... | H04N 19/13 |
| | | | | 375/240.24 |
| 2014/0348247 A1 | 11/2014 | Tsukuba et al. | | |
| 2015/0078443 A1* | 3/2015 | Kolesnikov | ............ | H04N 19/61 |
| | | | | 375/240.18 |
| 2015/0110199 A1* | 4/2015 | Ikai | ............ | H04N 19/159 |
| | | | | 375/240.18 |
| 2016/0219290 A1* | 7/2016 | Zhao | ............ | H04N 19/136 |
| 2016/0353110 A1* | 12/2016 | Zhang | ............ | H04N 19/126 |
| 2017/0064336 A1* | 3/2017 | Zhang | ............ | H04N 19/593 |

FOREIGN PATENT DOCUMENTS

| | | |
|---|---|---|
| CN | 108777797 A | 11/2018 |
| EP | 2800368 A1 | 11/2014 |
| EP | 2849445 A1 | 3/2015 |
| KR | 10-2014-0028118 A | 3/2014 |
| KR | 10-2014-0098121 A | 8/2014 |
| KR | 1020160102067 A | 8/2016 |
| KR | 10-2017-0107452 A | 9/2017 |
| KR | 101917239 B1 | 11/2018 |
| RU | 2628130 C2 | 8/2017 |
| WO | 2013006446 A1 | 1/2013 |
| WO | 2018-011303 A1 | 1/2018 |
| WO | 2013-107908 A1 | 7/2018 |
| WO | 2018/190594 A1 | 10/2018 |

OTHER PUBLICATIONS

"Recommendation ITU-T H.265," ITU-T Telecommunication Standardization Sector of ITU—Series H: Audiovisual and Multimedia Systems, Infrastructure of audiovisual services—coding of moving video, High Efficiency Video Coding, Apr. 2013, p. 177, (2 Pages).
Seregin et al. "Binarisation modification for last position coding" Joint Collaborative Team on Video Coding (JCT-VC) of ITU-T SG16 WP3 and ISO/IEC JTC1/SC29/WG11 6th Meeting: Torino, IT, Jul. 14-22, 2011, Document: JCTVC-F375, 10 pages.
Sarwer et al. "CE7-related: Context modeling of the position of last significant coefficient coding" Joint Video Experts Team (JVET) of ITU-T SG 16 WP 3 and ISO/IEC JTC 1/SC 29/WG 11 12th Meeting: Macao, CN, Oct. 3-12, 2018, Document: JVET-L0096-v1. 5 pages.
Sole et al. "Transform Coefficient Coding in HEVC" IEEE Transactions on Circuits and Systems for Video Technology, vol. 22, No. 12, Dec. 2012, pp. 1765-1777.
Xin Zhao, "CE6: Block size dependent zero-out transform (Test 1.14)" JVET-K0083-v1, Joint Video Experts Team (JVET) of ITU-T SG 16 WP 3 and ISO/IEC JTC 1/SC 29/WG11, 11th meeting—Ljubljana, SI, Jul. 3, 2018.
Sole et al. "Transform Coefficient Coding in HEVC" 2012 IEEE, 13 Pages.
Seregin et al. "Binarisation modification for last position coding" Joint Collaborative Team on Video Coding (JCT-VC) of ITU-T SG16 WP3 and ISO/IEC JTC1/SC29/WG11 6th Meeting: Torino, IT, Jul. 14-22, 2011, Document JCTVC-F375, 8 Pages.
U.S. Appl. No. 17/148,970, filed Jan. 14, 2021.
U.S. Appl. No. 16/841,062 now U.S. Pat. No. 10,958,939.
Continuation of U.S. Pat. No. 11,218,733.
Continuation of U.S. Pat. No. 10,958,939.

* cited by examiner

METHOD OF CODING TRANSFORM COEFFICIENT BASED ON HIGH FREQUENCY ZEROING AND APPARATUS THEREOF

CROSS-REFERENCE TO RELATED APPLICATIONS

This application is a continuation of U.S. application Ser. No. 17/148,970 filed Jan. 14, 2021, which is a continuation of U.S. application Ser. No. 16/841,062 filed Apr. 6, 2020 issued as U.S. Pat. No. 10,958,939, which is a continuation of International Application PCT/KR2019/015330, with an international filing date of Nov. 12, 2019, which claims the benefit of U.S. Provisional Application Nos. 62/760,033 filed on Nov. 12, 2018, and 62/792,824 filed on Jan. 15, 2019, the contents of which are all hereby incorporated by reference herein in their entirety.

BACKGROUND OF THE DISCLOSURE

Field of the Disclosure

The present disclosure relates to an image coding technique, and more particularly, to a method of coding a transform coefficient based on high frequency zeroing in an image coding system, and an apparatus thereof.

Related Art

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical problem to be addressed by the present disclosure lies in providing a method and an apparatus which increase image coding efficiency.

Another technical problem to be addressed by the present disclosure lies in providing a method and an apparatus which increase efficiency of residual coding.

Still another technical problem to be addressed by the present disclosure lies in providing a method and an apparatus which increase efficiency of transform coefficient level coding.

Still another technical problem to be addressed by the present disclosure lies in providing a method and an apparatus which increase residual coding efficiency by coding a transform coefficient based on high frequency zeroing.

Still another problem to be addressed by the present disclosure lies in providing a method and an apparatus which code position information of a last significant coefficient in a current block (or current transform block) based on high frequency zeroing.

Still another technical problem to be addressed by the present disclosure lies in providing a method and an apparatus which derive a maximum length of a codeword representing a last significant transform coefficient based on a size of a region in the current block, to which high frequency zeroing is not applied when transform coefficients for the current block (or current transform block) are coded based on the high frequency zeroing.

Still another technical problem to be addressed by the present disclosure lies in providing a method and an apparatus which binarize last significant coefficient prefix information and last significant coefficient suffix information when high frequency zeroing is performed.

According to an example of the present disclosure, there is provided an image decoding method which is performed by a decoding apparatus. The method includes receiving a bitstream including residual information; deriving quantized transform coefficients for a current block based on the residual information included in the bitstream; deriving transform coefficients for the current block from the quantized transform coefficients based on an inverse quantization process; deriving residual samples for the current block by applying inverse transform to the derived transform coefficients; and generating a reconstructed picture based on the residual samples for the current block, wherein each of the transform coefficients for the current block is related to a high frequency transform coefficient region consisting of transform coefficient 0, or a low frequency transform coefficient region including at least one significant transform coefficient, the residual information includes last significant coefficient prefix information and last significant coefficient suffix information on position of last non-zero transform coefficient among the transform coefficients for the current block, the position of the last non-zero transform coefficient is determined based on prefix codeword, which represents the last significant coefficient prefix information, and the last significant coefficient suffix information, and a maximum length of the prefix codeword is determined based on a size of the low frequency transform coefficient region.

According to another example of the present disclosure, there is provided a decoding apparatus for performing image decoding. The decoding apparatus includes an entropy decoder which receives a bitstream including residual information, and derives quantized transform coefficients for a current block based on the residual information included in the bitstream; a dequantizer which derives transform coefficients for the current block from the quantized transform coefficients based on an inverse quantization process; an inverse transformer which derives residual samples for the current block by applying inverse transform to the derived transform coefficients; and an adder which generates a reconstructed picture based on the residual samples for the current block, wherein each of the transform coefficients for the current block is related to a high frequency transform coefficient region consisting of transform coefficient 0, or a low frequency transform coefficient region including at least one significant transform coefficient, the residual information includes last significant coefficient prefix information and last significant coefficient suffix information on position of a last non-zero transform coefficient among the transform coefficients for the current block, the position of the last non-zero transform coefficient is determined based on prefix codeword, which represents the last significant coefficient prefix information, and the last significant coefficient suffix information, and a maximum length of the prefix codeword is determined based on a size of the low frequency transform coefficient region.

According to still another example of the disclosure, there is provided an image encoding method which is performed by an encoding apparatus. The method includes deriving residual samples for a current block; deriving transform coefficients for the current block by transforming the residual samples for the current block; deriving quantized transform coefficients from the transform coefficients based on a quantization process; and encoding residual information including information on the quantized transform coefficients, wherein each of the transform coefficients for the current block is related to a high frequency transform coefficient region consisting of transform coefficient 0, or a low frequency transform coefficient region including at least one significant transform coefficient, the residual information includes last significant coefficient prefix information and last significant coefficient suffix information on position of a last non-zero transform coefficient among the transform coefficients for the current block, the position of the last non-zero transform coefficient is based on prefix codeword, which represents the last significant coefficient prefix information, and the last significant coefficient suffix information, and a maximum length of the prefix codeword is determined based on a size of the low frequency transform coefficient region.

According to still another example of the present disclosure, there is provided an encoding apparatus for performing image encoding. The encoding apparatus includes a subtractor which derives residual samples for a current block; a transformer which derives transform coefficients for the current block by transforming the residual samples for the current block; a quantizer which derives quantized transform coefficients from the transform coefficients based on a quantization process; and an entropy encoder which encodes residual information including information on the quantized transform coefficients, wherein each of the transform coefficients for the current block is related to a high frequency transform coefficient region consisting of transform coefficient 0, or a low frequency transform coefficient region including at least one significant transform coefficient, the residual information includes last significant coefficient prefix information and last significant coefficient suffix information on position of a last non-zero transform coefficient among the transform coefficients for the current block, the position of the last non-zero transform coefficient is based on prefix codeword, which represents the last significant coefficient prefix information, and the last significant coefficient suffix information, and a maximum length of the prefix codeword is determined based on a size of the low frequency transform coefficient region.

According to still another example of the present disclosure, there is provided a decoder-readable storage medium which stores information on instructions which cause a video decoding apparatus to perform decoding methods according to some examples.

According to still another example of the present disclosure, there is provided a decoder-readable storage medium which stores information on instructions which cause a video decoding apparatus to perform a decoding method according to an example. The decoding method according to the example includes receiving a bitstream including residual information; deriving quantized transform coefficients for a current block based on the residual information included in the bitstream; deriving transform coefficients for the current block from the quantized transform coefficients based on an inverse quantization process; deriving residual samples for the current block by applying inverse transform to the derived transform coefficients; and generating a reconstructed picture based on the residual samples for the current block, wherein each of the transform coefficients for the current block is related to a high frequency transform coefficient region consisting of transform coefficient 0, or a low frequency transform coefficient region including at least one significant transform coefficient, the residual information includes last significant coefficient prefix information and last significant coefficient suffix information on position of last non-zero transform coefficient among the transform coefficients for the current block, the position of the last non-zero transform coefficient is determined based on prefix codeword, which represents the last significant coefficient prefix information, and the last significant coefficient suffix information, and a maximum length of the prefix codeword is determined based on a size of the low frequency transform coefficient region.

According to the present disclosure, it is possible to increase general image/video compression efficiency.

According to the present disclosure, it is possible to increase the efficiency of residual coding.

According to the present disclosure, it is possible to increase the efficiency of transform coefficient level coding.

According to the present disclosure, it is possible to increase residual coding efficiency by coding a transform coefficient based on high frequency zeroing (or, high frequency zero-out).

According to the present disclosure, it is possible to increase image coding efficiency by coding position information of a last significant transform coefficient in a current block (or current transform block) based on high frequency zeroing.

According to the present disclosure, it is possible to increase image coding efficiency by deriving a maximum length of a codeword representing a last significant transform coefficient based on a size of a region in the current block, to which high frequency zeroing is not applied when transform coefficients for the current block (or current transform block) are coded based on the high frequency zeroing.

According to the present disclosure, when the high frequency zeroing is applied, by performing binarization on a syntax element based on the size of a low frequency zeroing region (or, region to which the high frequency zeroing is not applied), it is possible to perform coding more efficiently, and improve the throughput of CABAC by reducing the number of context-coded bins.

DESCRIPTION OF EXEMPLARY EMBODIMENTS

Figure 1:
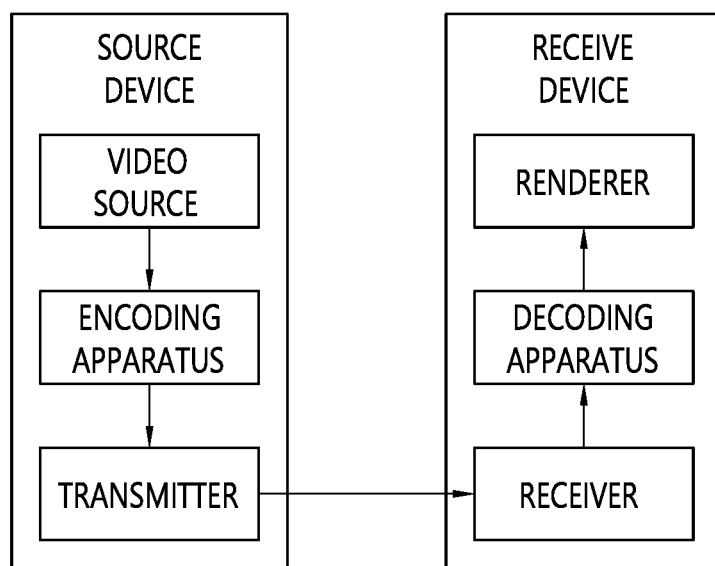
FIG. 1 schematically represents an example of a video/image coding system to which the present disclosure may be applied.

According to an example of the present disclosure, there is provided an image decoding method which is performed by a decoding apparatus. The method includes receiving a bitstream including residual information; deriving quantized transform coefficients for a current block based on the residual information included in the bitstream; deriving transform coefficients for the current block from the quantized transform coefficients based on an inverse quantization process; deriving residual samples for the current block by applying inverse transform to the derived transform coefficients; and generating a reconstructed picture based on the residual samples for the current block, wherein each of the transform coefficients for the current block is related to a high frequency transform coefficient region consisting of transform coefficient 0, or a low frequency transform coefficient region including at least one significant transform coefficient, the residual information includes last significant coefficient prefix information and last significant coefficient suffix information on position of last non-zero transform coefficient among the transform coefficients for the current block, the position of the last non-zero transform coefficient is determined based on prefix codeword, which represents the last significant coefficient prefix information, and the last significant coefficient suffix information, and a maximum length of the prefix codeword is determined based on a size of the low frequency transform coefficient region.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "comprise", "include", and the like are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is embodied by a separate hardware or software. For example, any two or more of these components may be combined to form a single component, and any single component may be divided into plural components. The embodiments in which components are combined and/or divided will fall into the scope of the patent right of the present disclosure as long as they do not depart from the essence of the present disclosure.

Hereinafter, preferred embodiments of the present disclosure will be explained in more detail while referring to the attached drawings. Hereinafter, the same reference signs are used for the same components on the drawings, and repeated descriptions for the same components may be omitted.

FIG. 1 schematically represents an example of a video/image coding system to which the present disclosure may be applied.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consists of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/"and"," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
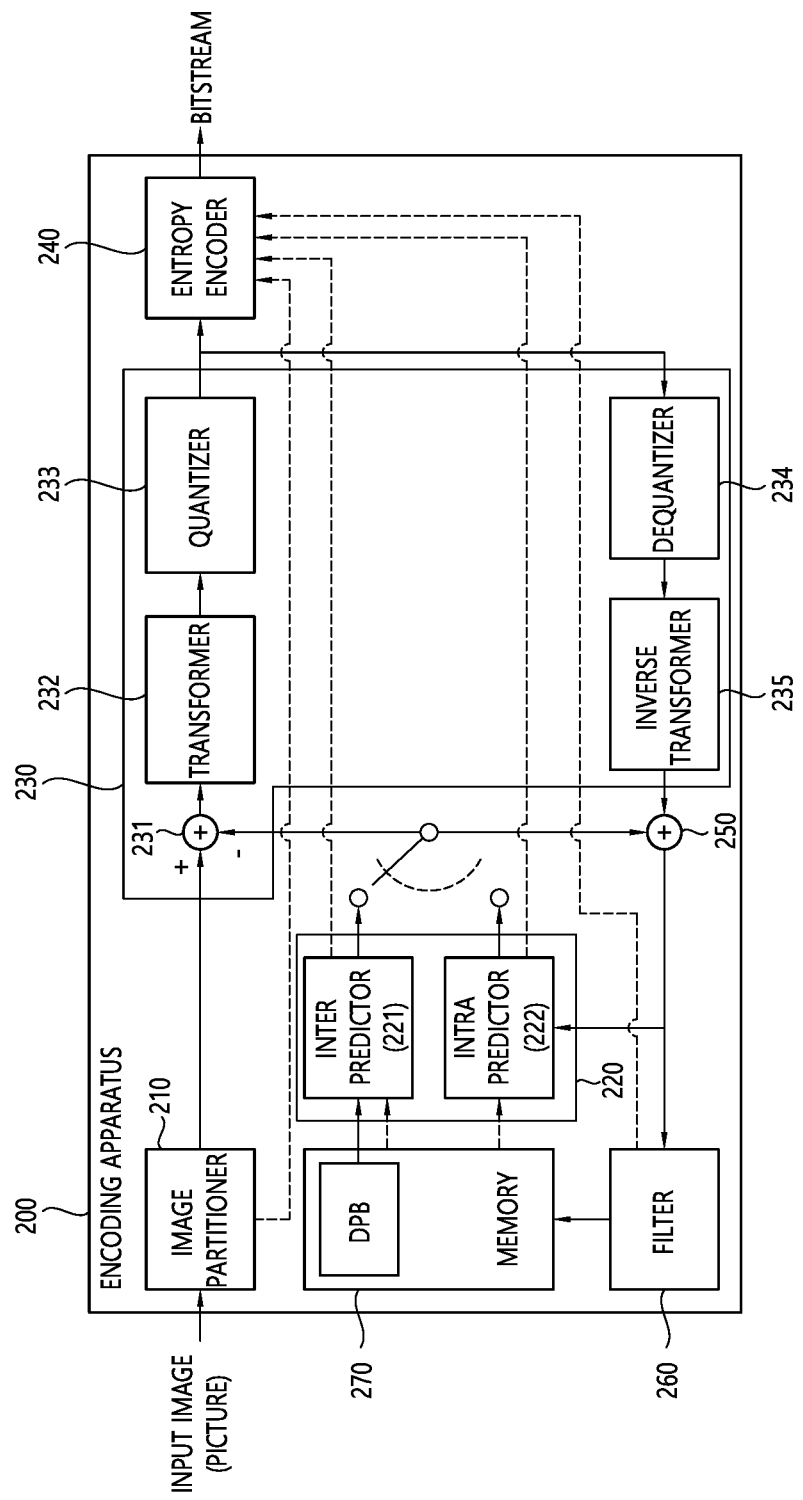
FIG. 2 is a diagram schematically describing a configuration of a video/image encoding apparatus to which the present disclosure may be applied.

FIG. 2 is a diagram schematically describing a configuration of a video/image encoding apparatus to which the present disclosure may be applied. Hereinafter, what is referred to as the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
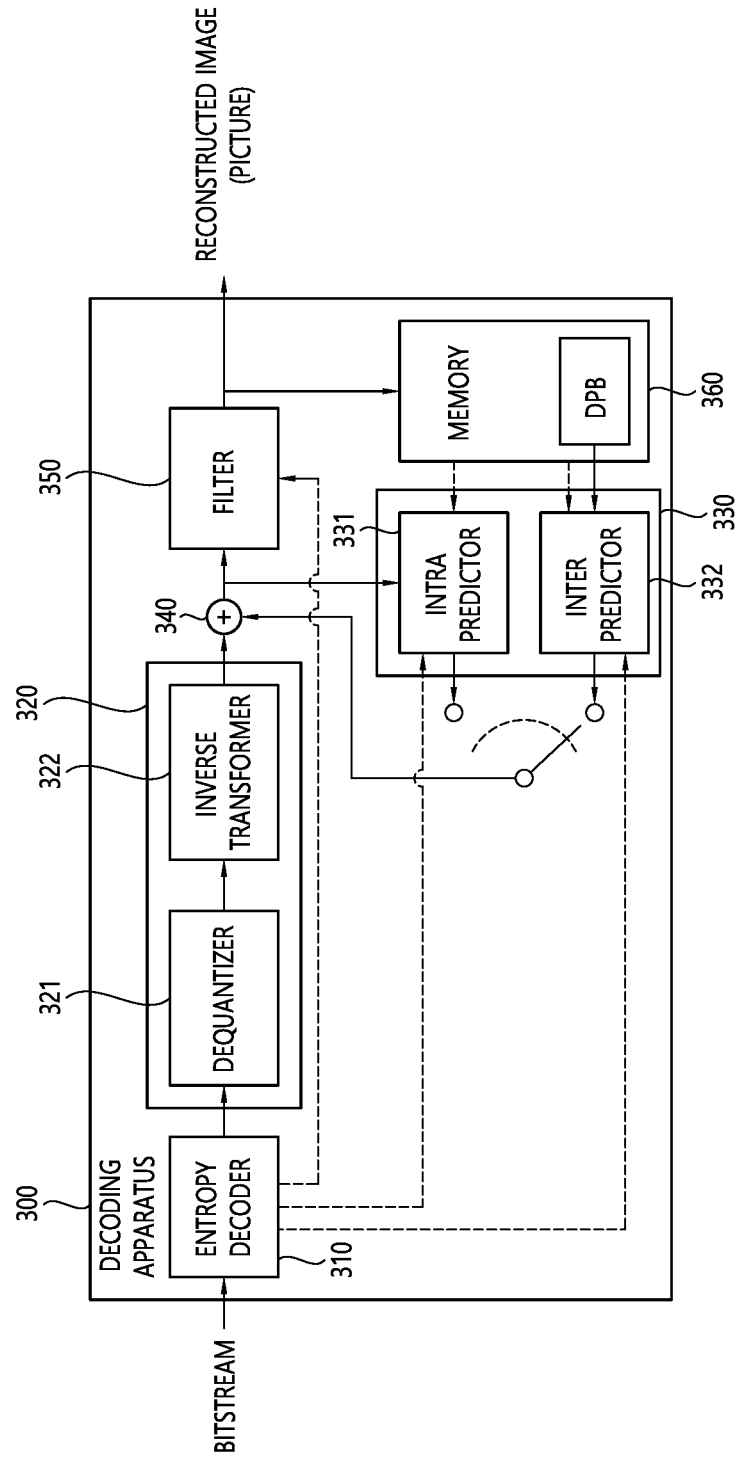
FIG. 3 is a diagram schematically describing a configuration of a video/image decoding apparatus to which the present disclosure may be applied.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be indentically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstruction samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4A:
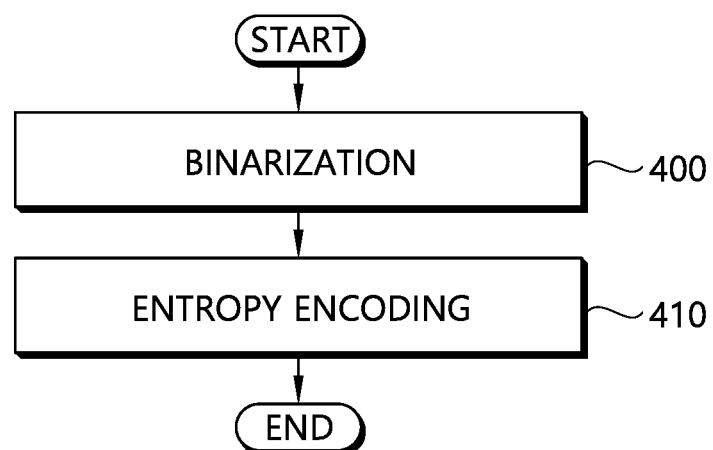
FIGS. 4A and 4B are a drawing for explaining the configuration and operation of the entropy encoder according to an example.
Figure 4B:
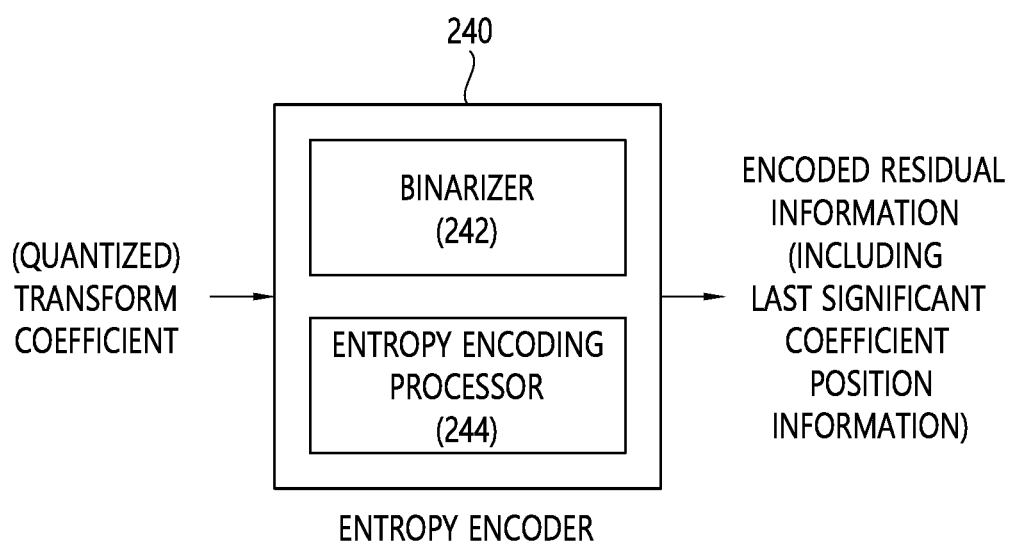

FIGS. 4A and 4B are a drawing for explaining the configuration and operation of the entropy encoder according to an embodiment.

Referring to FIGS. 4A and 4B, the encoding apparatus (entropy encoder) may perform a residual coding procedure on (quantized) transform coefficients. The encoding apparatus may perform residual coding on (quantized) transform coefficients in the current block (current coding block (CB) or current transform block (TB)) according to a scan order as described later in FIG. 6. The encoding apparatus, for example, may generate and encode various syntax elements related to residual information as described in Table 1 below. S400 and S410 may be incorporated into the residual information encoding procedure of FIG. 2.

TABLE 1

| | Descriptor |
|---|---|
| residual_coding( x0, y0, log2TbWidth, log2TbHeight, cIdx ) { | |
| if( transform_skip_enabled_flag && | |
| ( cIdx != 0 \|\| cu_mts_flag[ x0 ][ y0 ] = = 0 ) && | |
| ( log2TbWidth <= 2 ) && ( log2TbHeight <= 2 ) ) | |
| transform_skip_flag[ x0 ][ y0 ][ cIdx ] | ae (v) |
| last_sig_coeff_x_prefix | ae (v) |
| last_sig_coeff_y_prefix | ae (v) |
| if( last_sig_coeff_x_prefix > 3 ) | |
| last_sig_coeff_x_suffix | ae (v) |
| if( last_sig_coeff_y_prefix > 3 ) | |
| last_sig_coeff_y_suffix | ae (v) |
| log2SbSize = ( Min( log2TbWidth, log2TbHeight ) < 2 ? 1 : 2 ) | |
| numSbCoeff = 1 << ( log2SbSize << 1 ) | |
| lastScanPos = numSbCoeff | |
| lastSubBlock = ( 1 << ( | |
| log2TbWidth + log2TbHeight − 2 * log2SbSize ) ) − 1 | |
| do { | |
| if( lastScanPos = = 0 ) { | |
| lastScanPos = numSbCoeff | |
| lastSubBlock- - | |
| } | |
| lastScanPos- - | |
| xS = | |
| DiagScanOrder[ log2TbWitdth - logSbSize ][ log2TbHeight - log2SbSize ][ lastSubBlock ][ 0 ] | |
| yS = | |
| DiagScanOrder[ log2TbWitdth - logSbSize ][ log2TbHeight - | |

TABLE 1-continued

| | Descriptor |
|---|---|
| log2SbSize ][ lastSubBlock ][ 1 ]<br>xC = ( xS << log2SbSize ) +<br>DiagScanOrder[ log2SbSize ][ log2SbSize ][ last ScanPos ][ 0 ]<br>yC = ( yS << log2SbSize ) +<br>DiagScanOrder[ log2SbSize ][ log2SbSize ][ last ScanPos ][ 1 ]<br>} while( (xC != LastSignificantCoeffX ) \|\|<br>(yC != LastSignificantCoeffY ) )<br>QState = 0<br>for( i = lastSubBlock; i >= 0; i − − ) {<br>  startQStateSb = QState<br>  xS =<br>DiagScanOrder[ log2TbWidth - log2SbSize ][ log 2TbHeight -<br>log2SbSize ][ lastSubBlock ][ 0 ]<br>  yS =<br>DiagScanOrder[ log2TbWidth - log2SbSize ][ log 2TbHeight -<br>log2SbSize ][ lastSubBlock ][ 1 ]<br>  inferSbDcSigCoeffFlag = 0<br>  if( ( i < lastSubBlock ) && ( i > 0 ) ) {<br>    coded_sub_block_flag[ xS ][ yS ] | ae (v) |
|     inferSbDcSigCoeffFlag = 1<br>  }<br>  firstSigScanPosSb = numSbCoeff<br>  lastSigScanPosSb = −1<br>  for( n = ( i = = lastSubBlock ) ? lastScanPos - 1 :<br>numSbCoeff −1; n>= 0; n-- ){<br>    xC = ( xS << log2SbSize ) +<br>DiagScanOrder[ log2SbSize ][ log2SbSize ][ n ][ 0 ]<br>    yC = ( yS << log2SbSize ) +<br>DiagScanOrder[ log2SbSize ][ log2SbSize ][ n ][ 1 ]<br>    if( coded_sub_block_flag[ xS ][ yS ] && ( n > 0 \|\| !<br>inferSbDcSigCoeffFlag ) ) {<br>      sig_coeff_flag[ xC ][ yC ] | ae (v) |
|     }<br>    if( sig_coeff_flag[ xC ][ yC ] ) {<br>      par_level_flag[ n ] | ae (v) |
|       rem_abs_gt1_flag[ n ] | ae (v) |
|       if( lastSigScanPosSb = = −1 )<br>        lastSigScanPosSb = n<br>      firstSigScanPosSb = n<br>    }<br>    AbsLevelPass1[ xC ][ yC ] = sig_coeff_flag[ xC ][ yC ] +<br>par_level_flag[ n ] + 2 * rem_abs_gt1_flag[ n ]<br>    if( dep_quant_enabled_flag )<br>      QState = QStateTransTable[ QState ][ par_level_flag[ n ] ]<br>  }<br>  for( n = numSbCoeff - 1; n = 0; n-- ) {<br>    if( rem_abs_gt1_flag[ n ] )<br>      rem_abs_gt2_flag[ n ] | ae (v) |
|   }<br>  for( n = numSbCoeff - 1; n = 0; n-- ) {<br>    xC = ( xS << log2SbSize ) +<br>DiagScanOrder[ log2SbSize ][ log2SbSize ][ n ][ 0 ]<br>    yC = ( yS << log2SbSize ) +<br>DiagScanOrder[ log2SbSize ][ log2SbSize ][ n ][ 1 ]<br>    if( rem_abs_gt2_flag[ n ] )<br>      abs_remainder[ n ]<br>    AbsLevelPass[ xC ][ yC ] = AbsLevelPass1[ xC ][ yC ] + 2 * (<br>rem_abs_gt2_flag[ n ] + abs_remainder[ n ] )<br>  }<br>  if( dep_quant_enabled_flag \|\| !sign_data_hiding_enabled_flag )<br>    signHidden = 0<br>  else<br>    signHidden = ( lastSigScanPosSb - firstSigScanPosSb > 3 ? 1 : 0<br>  for( n =numSbCoeff - 1; n >= 0; n-- ) {<br>    xC = ( xS << log2SbSize ) +<br>DiagScanOrder[ log2SbSize ][ log2SbSize ][ n ][ 0 ]<br>    yC = ( yS << log2SbSize ) +<br>DiagScanOrder[ log2SbSize ][ log2SbSize ][ n ][ 1 ]<br>    if( sig_coeff_flag[ xC ][ yC ] && ( !signHidden \|\|<br>( n, != firstSigScanPosSb ) ) )<br>      coeff_sign_flag[ n ] | ae (v) |
|   }<br>  if( dep_quant_enabled_flag ) {<br>    QState = startQStateSb<br>    for( n = numSbCoeff - 1; n >= 0; n-- ) {<br>      xC = ( xS << log2SbSize ) +<br>DiagScanOrder[ log2SbSize ][ log2SbSize ][ n ][ 0 ]<br>      yC = ( yS << log2SbSize ) + | |

TABLE 1-continued

Descriptor

```
DiagScanOrder[ log2SbSize ][ log2SbSize ][ n ][ 1 ]
if( sig_coeff_flag[ xC ][ yC ] )
TransCoeffLevel[ x0 ][ y0 ][ cIdx ][ xC ][ yC ] = 2
AbsLevel[ xC ][ yC ] - ( QState > 1 1 : 0 ) ) * ( 1 - 2 *
coeff_sing_flag[ n ] )
QState = QStateTransTable[ QState ][ par_level_flag[ n ] ]
} else {
sumAbsLevel = 0
for( n = numSbCoeff - 1; n >= 0; n-- ) {
xC = ( xS << log2SbSize ) +
DiagScanOrder[ log2SbSize ][ log2SbSize ][ n ][ 0 ]
yC = ( yS << log2SbSize ) +
DiagScanOrder[ log2SbSize ][ log2SbSize ][ n ][ 1 ]
if( sig_coeff_flag[ xC ][ yC ] ) {
TransCoeffLevel[ x0 ][ y0 ][ cIdx ][ xC ][ yC ] =
AbsLevel[ xC ][ yC ] * ( 1 - 2 * coeff_sing_flag[ n ] )
if( signHidden ) {
sumAbsLevel += AbsLevel[ xC ][ yC ]
if( ( n = = fistSigScanPosSb ) && ( sumAbsLevel % 2 ) ==1 ) )
TransCoeffLevel[ x0 ][ y0 ][ cIdx ][ xC ][ yC ] =
-TransCoeffLevel[ x0 ][ y0 ][ cIdx ][ xC ][ yC ]
}
}
}
}
}
}
if( cu_mts_flag[ x0 ][ y0 ] && ( cIdx = = 0 ) &&
!transform_skip_flag[ x0 ][ y0 ][ cIdx ] && (
( CuPredMode[ x0 ][ y0 ] = = MODE_INTRA &&
numSigCoeff > 2 ) | | ( CuPredMode[ x0 ][ y0 ] = = MODE_INTER )
) ) {
mts_idx[ x0 ][ y0 ]                                                    ae (v)
}
```

The encoding apparatus may perform binarization on syntax elements related to residual including last_sig_coeff_x_prefix and last_sig_coeff_y_prefix (S400). The last_sig_coeff_x_prefix and the last_sig_coeff_y_prefix may be derived based on position of a last significant coefficient in a current block.

The last_sig_coeff_x_prefix and last_sig_coeff_y_prefix may represent an example of last significant coefficient prefix information on position of a last non-zero transform coefficient among the transform coefficients for the current block. More specifically, last_sig_coeff_x_prefix may represent an example of an x-axis prefix information, which is one of the last significant coefficient prefix information, and last_sig_coeff_y_prefix may represent an example of a y-axis prefix information, which is one of the last significant coefficient prefix information.

In this case, zero may be used as a value of cRiceParam. The encoding apparatus may derive a bin string for each of the last_sig_coeff_x_prefix and last_sig_coeff_yprefix through the binarization procedure. The binarization procedure may be performed by a binarizer 242 in the entropy encoder 240.

According to an embodiment, cMax value for each of last_sig_coeff_x_prefix and last_sig_coeff_y_prefix may be derived based on whether high frequency zeroing is applied. Specific equation for deriving cMax will be described later in FIG. 6. The cMax may represent a maximum length of a codeword (bin string) derived in the binarization procedure for last_sig_coeff_x_prefix or last_sig_coeff_y_prefix. When decreasing the value of cMax, a length of the codeword for last_sig_coeff_x_prefix or last_sig_coeff_y_prefix can be effectively shortened. And as the coded bin reduced by shortening the codeword is a context coded bin, there may be an advantage in terms of an image coding throughput.

Meanwhile, binarization may progress for the rest of syntax elements of Table 1 according to a predetermined method. For example, binarization may be performed on transform_skip_flag, last_sig_coeff_x_suffix, last_sig_coeff_y_suffix, coded_sub_block_flag, sig_coeff_flag, par_level_flag, rem_abs_gt1_flag, rem_abs_gt2_flag, coeff_sign_flag, mts_idx, or the like according to a fixed-length binarization process, and on abs_remainder, binarization corresponding thereto may be performed.

The encoding apparatus may perform entropy encoding on syntax elements related to residual coding including the last_sig_coeff_x_prefix and last_sig_coeff_y_prefix (S410). The encoding apparatus may perform entropy encoding based on a bin string for each of the last_sig_coeff_x_prefix and last_sig_coeff_y_prefix. The encoding apparatus may context-based or bypass-based encode the bin string based on a entropy coding technique such as context-adaptive arithmetic coding (CABAC) or context-adaptive variable length coding (CAVLC), and the output thereof may be incorporated into a bitstream. The entropy encoding procedure may be performed by an entropy encoding processor 244 in the entropy encoder 240. The bitstream may include various information for image/video decoding, such as prediction information or the like, other than residual information including information on last_sig_coeff_x_prefix and last_sig_coeff_y_prefix as described above. The bitstream may be transferred to the decoding apparatus through a (digital) storage medium or a network.

Figure 5A:
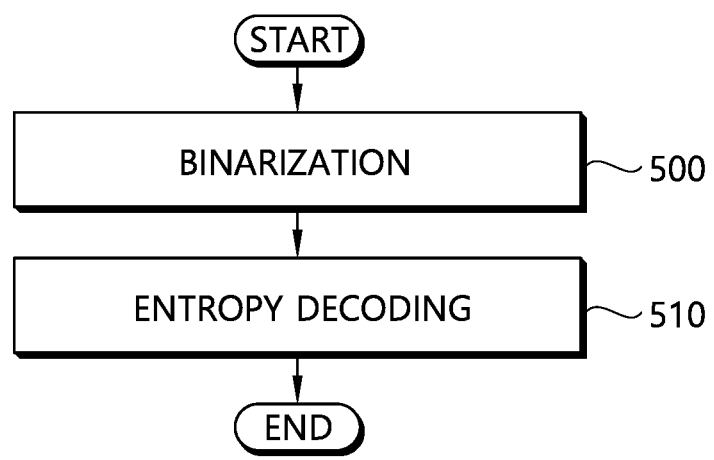
FIGS. 5A and 5B are a drawing for explaining the configuration and operation method of an entropy decoder according to an example.
Figure 5B:
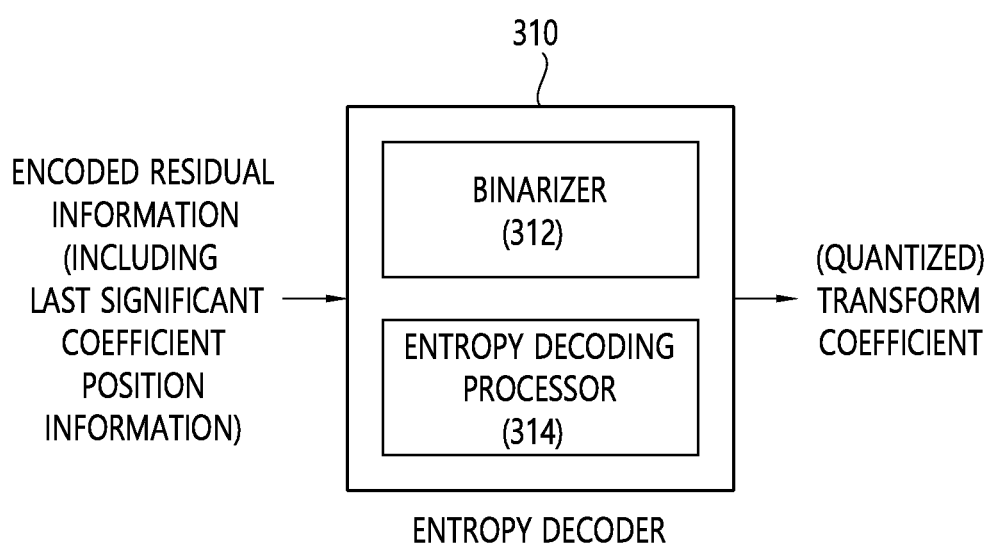

FIGS. 5A and 5B are a drawing for explaining the configuration and operation method of an entropy decoder according to an embodiment.

Referring to FIGS. 5A and 5B, the decoding apparatus (entropy decoder) may derive (quantized) transform coefficients by decoding encoded residual information. The decoding apparatus may derive (quantized) transform coefficients by decoding encoded residual information for a current block (current CB or current TB) as described later in FIG. 6. For example, the decoding apparatus may decode various syntax elements related to such residual information as written in Table 1, analyze values of associated syntax elements, and derive the (quantized) transform coefficients based on a value of analyzed syntax elements. S500 to S510 may be incorporated into a procedure which derives above-described (quantized) transform coefficients of FIG. 3.

The decoding apparatus may perform binarization on syntax elements related to residual including last_sig_coeff_x_prefix and last_sig_coeff_y_prefix (S500). In this case, zero may be used as a value of cRiceParam. The encoding apparatus may derive an available bin string for each available value of the last_sig_coeff_x_prefix and last_sig_coeff_y_prefix through the binarization procedure. The binarization procedure may be performed by a binarizer 312 in the entropy decoder 310. According to an embodiment, cMax value for each of last_sig_coeff_x_prefix and last_sig_coeff_yprefix may be derived based on whether high frequency zeroing is applied. Specific equation for deriving cMax will be described later in FIG. 6.

The cMax may represent a maximum length of a codeword (bin string) derived in the binarization procedure for last_sig_coeff_x_prefix or last_sig_coeff_y_prefix. When decreasing the value of cMax, a length of the codeword for last_sig_coeff_x_prefix or last_sig_coeff_y_prefix can be effectively shortened. And as the coded bin reduced by shortening the codeword is a context coded bin, there may be an advantage in terms of an image coding throughput.

Meanwhile, binarization may progress for the rest of syntax elements of Table 1 according to a predetermined method. For example, binarization may be performed on transform_skip_flag, last_sig_coeff_x_suffix, last_sig_coeff_y_suffix, coded_sub_block_flag, sig_coeff_flag, par_level_flag, rem_abs_gt1_flag, rem_abs_gt2_flag, coeff_sign_flag, mts_idx, or the like according to a fixed-length binarization process, and on abs_remainder, binarization corresponding thereto may be performed.

The decoding apparatus may perform entropy decoding on syntax elements related to residual coding including the last_sig_coeff_x_prefix and last_sig_coeff_y_prefix (S510). The decoding apparatus may compare derived bin string with the available bin strings while parsing and decoding sequentially each of bins for the last_sig_coeff_x_prefix. When a derived bin string is the same as one of the available bin strings, the value corresponding to the bin string may be derived as a value of the last_sig_coeff_x_prefix. When a derived bin string is the same as none of the available bin strings, the comparison procedure may be performed after further parsing and decoding next bit in the bitstream.

Further, the decoding apparatus may compare derived bin string with the available bin strings while parsing and decoding sequentially each of bins for the last_sig_coeff_y_prefix. When a derived bin string is the same as one of the available bin strings, the value corresponding to the bin string may be derived as a value of the last_sig_coeff_y_prefix. When a derived bin string is the same as none of the available bin strings, the comparison procedure may be performed after further parsing and decoding next bit in the bitstream. Through these processes, without using a start bit or an end bit for specific information (specific syntax element) in a bitstream, the information can be signaled using a variable length bit, by which relatively smaller bit can be assigned to a low value, thus increasing an overall coding efficiency.

The decoding apparatus may perform context-based or bypass-based decoding on each of bins in the bin string from a bitstream based on an entropy coding technique such as the CABAC, the CAVLC or the like. The entropy decoding procedure may be performed by an entropy decoding processor 314 in the entropy decoder 310. The decoding apparatus may derive a position of a last significant coefficient based on a value of the last_sig_coeff_x_prefix and a value of the last_sig_coeff_y_prefix. Specific calculation, for example, may be performed based on Table 2 below.

TABLE 2

The column position of the last significant coefficient in scanning order within a transform block LastSignificantCoeffX is derived as follows: // If last_sig_coeff_x_suffix is not present, the following applies:LastSignificantCoeffX = last_sig_coeff_x_prefix// Otherwise (last_sig_coeff_x_suffix is present), the following applies:LastSignificantCoeffX= (1<<((last_sig_coeff_x_prefix>>1)-1)) * (2+(last_sig_coeff_x_prefix&1)) + last_sig_coeff_x_suffix//The row position of the last significant coefficient in scanning order within a transform block LastSignificantCoeffY is derived as follows:// If last_sig_coeff_y_suffix is not present, the following applies:LastSignificantCoeffY = last_sigcoeff_y_prefix// Otherwise (last_sig_coeff_y_suffix is present), the following applies:LastSignificantCoeffY=(1<<((last_sig_coeff_y_prefix>>1)-))*(2+(last_sig_coeff_y_prefix&1))+last_sig_coeff_y_suffix In Table 2, LastSignificantCoeffX may represent and x-axis position of a last non-zero significant coefficient in the current (transform) block, and, LastSignificantCoeffY may represent a y-axis position of a last non-zero significant coefficient in the current (transform) block.

The bitstream may include various information for image/video decoding, such as prediction information or the like, other than residual information including information on last_sig_coeff_x_prefix and last_sig_coeff_y_prefix as described above. As described above, the bitstream may be transferred to the decoding apparatus through a (digital) storage medium or a network.

The decoding apparatus may derive residual samples for a current block by performing a dequantization procedure and/or an inverse transform procedure based on the (quantized) transform coefficients. Reconstructed samples may be generated based on the residual samples and prediction samples derived through inter/intra prediction, and a reconstructed picture including the reconstructed samples may be generated.

Figure 6:
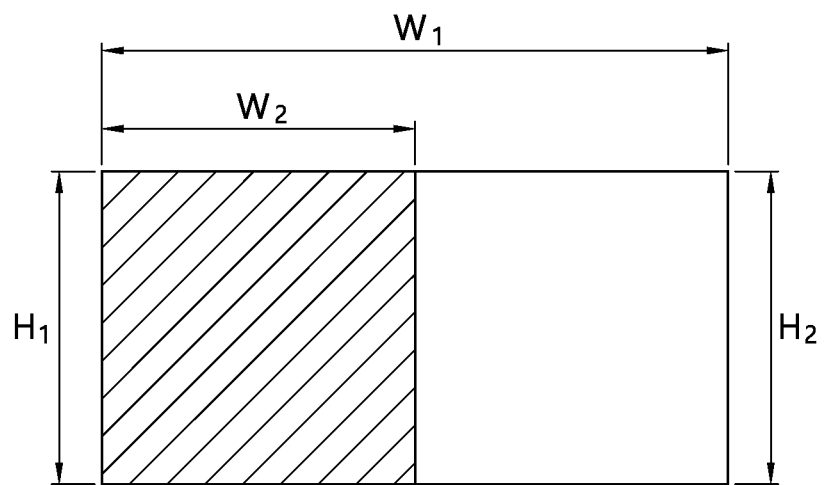
FIG. 6 is a drawing for explaining high frequency zeroing according to an example.

FIG. 6 is a drawing for explaining high frequency zeroing according to an example.

In the present specification, "high frequency zeroing" means a process by which transform coefficients related to a frequency equal to or higher than a certain value in a (transform) block having a first width size (or length) $W_1$ and a first height size (or length) $H_1$ are zeroed (i.e., determined as zero). When high frequency zeroing is applied, the transform coefficient values of the transform coefficients outside a low frequency transform coefficient region configured based on a second width size $W_2$ and a second height size $H_2$ among transform coefficients in the (transform) block may be all determined (set) as zero. The outside of the low frequency transform coefficient region may be referred to as a high frequency transform coefficient region. In an example, the low frequency transform coefficient region may be a region of a rectangular shape located from a top-left end of the (transform) block.

In the present specification, a specific term or sentence is used for defining a specific information or concept. For example, in the present specification, as described above, the process by which transform coefficients related to a frequency equal to or higher than a certain value in the (transform) block having the first width size (or length) $W_1$ and the first height size (or length) $H_1$ are zeroed is defined as "high frequency zeroing"; a region on which zeroing has been performed through the high frequency zeroing, "high frequency transform coefficient region"; and a region on which the zeroing is not performed, "low frequency transform coefficient region". In order to represent a size of the low frequency transform coefficient region, the second width size (or length) $W_2$ and the second height size (or length) $H_2$ are used.

However, the term "high frequency zeroing" may be replaced by various terms such as a high frequency zeroing, a high frequency zero-out, zero-out or the like; the term "high frequency transform coefficient region", various terms such as a high frequency zeroing applied region, a high frequency zeroing region, a high frequency region, a high frequency coefficient region, a high frequency zero-out region, a zero-out region or the like; and the term "low frequency transform coefficient region", various terms such as a high frequency zeroing non-applied region, a low frequency region, a low frequency coefficient region, a restricted region, or the like. So, in the present specification, when interpreting throughout the specification a specific term or sentence used for defining a specific information or concept, it is necessary to pay attention to various operations, functions and effects according to contents which the term intends to represent rather being limited to its name.

In an example, there may be proposed a method for performing binarization of syntax elements, last_sig_coeff_x_prefix and last_sig_coeff_y_prefix, for a (transform) block (TB, TU or CB) to which the high frequency zeroing is applied. last_sig_coeff_x_prefix and last_sig_coeff_y_prefix may be binarized with a truncated Rice code, and at this time, a value of cRiceParam may use 0. A value of cMax used in binarization for the truncated Rice code may be determined based on Equation 1 when performing the binarization of last_sig_coeff_x_prefix, and be determined based on Equation 2 when performing the binarization of last_sig_coeff_y_prefix.

$$c\text{Max}=(\log_2 W_1 <<1)-1 \quad \text{[Equation 1]}$$

$$c\text{Max}=(\log_2 H_1 <<1)-1 \quad \text{[Equation 2]}$$

where $W_1$ may represent a width length (or width) of the (transform) block, and $H_1$ may represent a height length (or height) of the (transform) block. For example, in the case of a 64×32 transform block as in FIG. 6, $W_1$ is 64, and $H_1$ is 32. Therefore, the value of cMax for binarization of last_sig_coeff_x_prefix may be 11, and the value of cMax for binarization of last_sig_coeff_y_prefix may be 9.

Table 3 below represents binarization when $W_1$ or $H_1$ is 32, and Table 4 below represents binarization codeword when $W_1$ or $H_1$ is 64. In an example, the truncated Rice code binarization may be performed based on a size of the transform block, and thus, as in Table 4 below, the codeword of last_sig_coeff_x_prefix or last_sig_coeff_y_prefix for the coding for the value of LastSignificantCoeffX or LastSignificantCoeffY being 32 to 47 may be '11111111110', and the codeword of last_sig_coeff_x_prefix or last_sig_coeff_y_prefix for the coding for the value of LastSignificantCoeffX or LastSignificantCoeffY being 48 to 63 may be '1111111111'. In both cases, the binarization may be performed based on 11 bins. The codeword may be called a bin string.

TABLE 3

| LastSignificantCoeffXorLastSignificantCoeffY | codeword | length of the codeword |
|---|---|---|
| 0 | 0 | 1 |
| 1 | 10 | 2 |
| 2 | 110 | 3 |
| 3 | 1110 | 4 |
| 4, 5 | 11110 | 5 |
| 6, 7 | 111110 | 6 |
| 8~11 | 1111110 | 7 |
| 12~15 | 11111110 | 8 |
| 16~23 | 111111110 | 9 |
| 24~31 | 111111111 | 9 |

TABLE 4

| LastSignificantCoeffXorLastSignificantCoeffY | codeword | length of the codeword |
|---|---|---|
| 0 | 0 | 1 |
| 1 | 10 | 2 |
| 2 | 110 | 3 |
| 3 | 1110 | 4 |
| 4, 5 | 11110 | 5 |
| 6, 7 | 111110 | 6 |
| 8~11 | 1111110 | 7 |
| 12~15 | 11111110 | 8 |
| 16~23 | 111111110 | 9 |
| 24~31 | 1111111110 | 10 |
| 32~47 | 11111111110 | 11 |
| 48~63 | 11111111111 | 11 |

As shown in Table 1 above, when the value of last_sig_coeff_x_prefix is greater than 3, last_sig_coeff_x_suffix may be further signaled, and LastSignificantCoeffX may be derived based on the value of last_sig_coeff_x_suffix. For example, the codeword of last_sig_coeff_x_prefix for the coding for the value of LastSignificantCoeffX being 32 to 47 may be '11111111110', and which value among 32 to 47 will be used may be determined based on the value of last_sig_coeff_x_suffix. As shown in Table 1 above, when the value of last_sig_coeff_y_prefix is greater than 3, last_sig_coeff_y_suffix may be further signaled, and LastSignificantCoeffY may be derived based on the value of last_sig_coeff_y_suffix. For example, the codeword of last_sig_coeff_x_prefix for the coding for the value of LastSignificantCoeffY being 32 to 47 may be '11111111110', and which value among 32 to 47 will be used may be determined based on the value of last_sig_coeff_y_suffix.

Specific calculation for deriving LastSignificantCoeffX or LastSignificantCoeffY may be performed like, for example, the following.

TABLE 5

The column position of the last significant coefficient in scanning order within a transform block LastSignificantCoeffX is derived as follows: // If last_sig_coeff_x_suffix is not present, the following applies: LastSignificantCoeffX = last_sig_coeff_x_prefix// Otherwise (last_sig_coeff_x_suffix is present), the following applies: LastSignificantCoeffX = (1<<((last_sig_coeff_x_prefix>>1) − 1)) * (2 + (last_sig_coeff_x_prefix&1)) + last_sig_coeff_x_suffix// The row position of the last significant coefficient in scanning order within a transform block LastSignifcantCoeffY is derived as follows: // If last_sig_coeff_y_suffix is not present, the following applies: LastSignificantCoeffY = last_sigcoeff_y_prefix// Otherwise (last_sig_coeff_y_suffix is present), the following applies: LastSignificantCoeffY = (1<<((last_sig_coeff_y_prefix>>1) − 1)) * (2 + (last_sig_coeff_y_prefix&1)) + last_sig_coeff_y_suffix The high frequency zeroing means zeroing coefficients of a frequency higher than a certain value in a transform block having a first width size $W_1$ or a first height size $H_1$ (i.e., determined as zero), and limiting residual transform coefficients to a second width size $W_2$ or a second height size $H_2$. At this time, in an example, a method in which the binarization is performed based on a truncated Rice code based on a size (second width size or second height size) of a restricted region derived through the high frequency zeroing may be considered, rather than a method in which binarization is performed based on a truncated Rice code based on a size (first width size or first height size) of a transform block. After defining cMax for last_sig_coeff_x_prefix and cMax for last_sig_coeff_y_prefix as Equations 3 and 4, respectively, using the second width size and the second height size, the truncated Rice code may be generated.

$$cMax=(\log_2(\min(W_1,W_2)))<<1)-1 \quad [\text{Equation 3}]$$

$$cMax=(\log_2(\min(H_1,H_2)))<<1)-1 \quad [\text{Equation 4}]$$

In an example, when the first width size or first height size is 64 and the second width size or the second height size is 32, the truncated Rice code derived based on Equations 3 and 4 may be like Table 6 below. Through the high frequency zeroing, residual transform coefficient is disappeared from high frequency coefficients in a high frequency transform coefficient region formed outside the second width size or the second height size, so it is possible to design a binarization codeword like Table 6 below.

In an example, $W_2$ and $H_2$ may be set as a fixed value. Alternatively, $W_2$ and $H_2$ may be determined based on $W_1$ and $H_1$. Alternatively, information indicating $W_2$ and $H_2$ may be signaled from an encoding apparatus to a decoding apparatus. In an example, $W_2$ and $H_2$ may be set as 32 or 16, respectively. In another example, $W_2$ and $H_2$ may be derived as a half of $W_1$ and a half of $H_1$, respectively. In still another example, $W_2$ and $H_2$ may be derived as a half of $\max(W_1, H_1)$. However, these are examples, and $W_2$ and $H_2$ may be determined according to other various methods set in an encoding apparatus and a decoding apparatus. Through the proposed method, it is possible to effectively reduce the length of a codeword for some values of LastSignificantCoeffX or LastSignificantCoeffY. Further, as the coded bin reduced through this is a context-coded bin, there may be an advantage in terms of a throughput.

TABLE 6

| LastSignificantCoeffXorLastSignificantCoeffY | codeword | length of the codeword |
|---|---|---|
| 0 | 0 | 1 |
| 1 | 10 | 2 |
| 2 | 110 | 3 |
| 3 | 1110 | 4 |
| 4, 5 | 11110 | 5 |
| 6, 7 | 111110 | 6 |
| 8~11 | 1111110 | 7 |
| 12~15 | 11111110 | 8 |
| 16~23 | 111111110 | 9 |
| 24~31 | 111111111 | 9 |
| 32~47 | N/A | N/A |
| 48~63 | N/A | N/A |

In an example, the residual coding method described above in FIGS. 4A to 5B may be performed based on examples described in FIG. 6. In another example, an encoding method to be described later in FIG. 7 or a decoding method to be described later in FIG. 9 may be performed based on examples described in FIG. 6.

Figure 7:
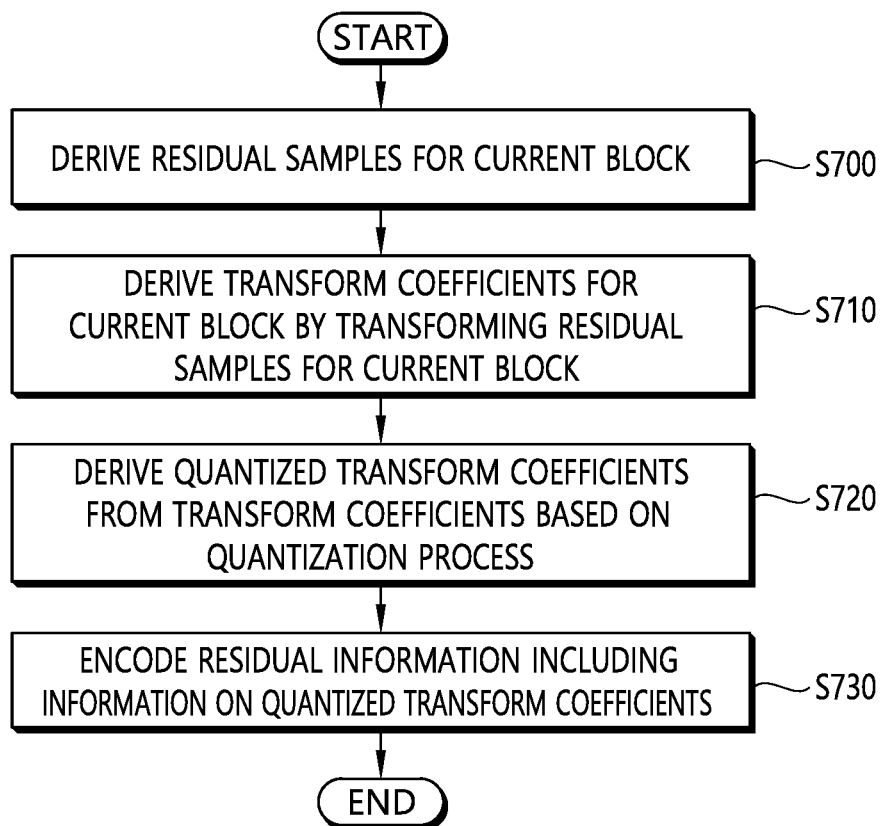
FIG. 7 is a flowchart showing operation of an encoding apparatus according to an example.
Figure 8:
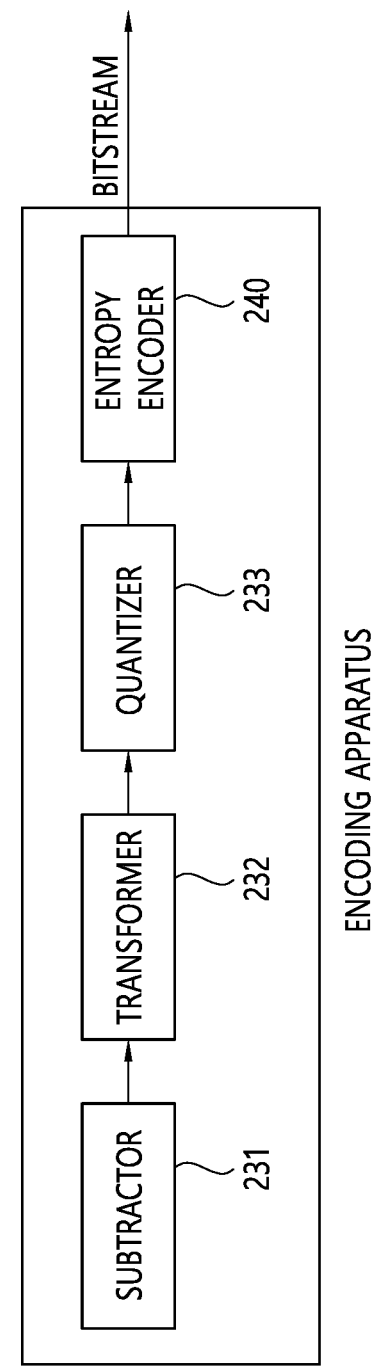
FIG. 8 is a block diagram showing a configuration of an encoding apparatus according to an example.

FIG. 7 is a flowchart showing operation of an encoding apparatus according to an example, and FIG. 8 is a block diagram showing a configuration of an encoding apparatus according to an example.

Figure 9:
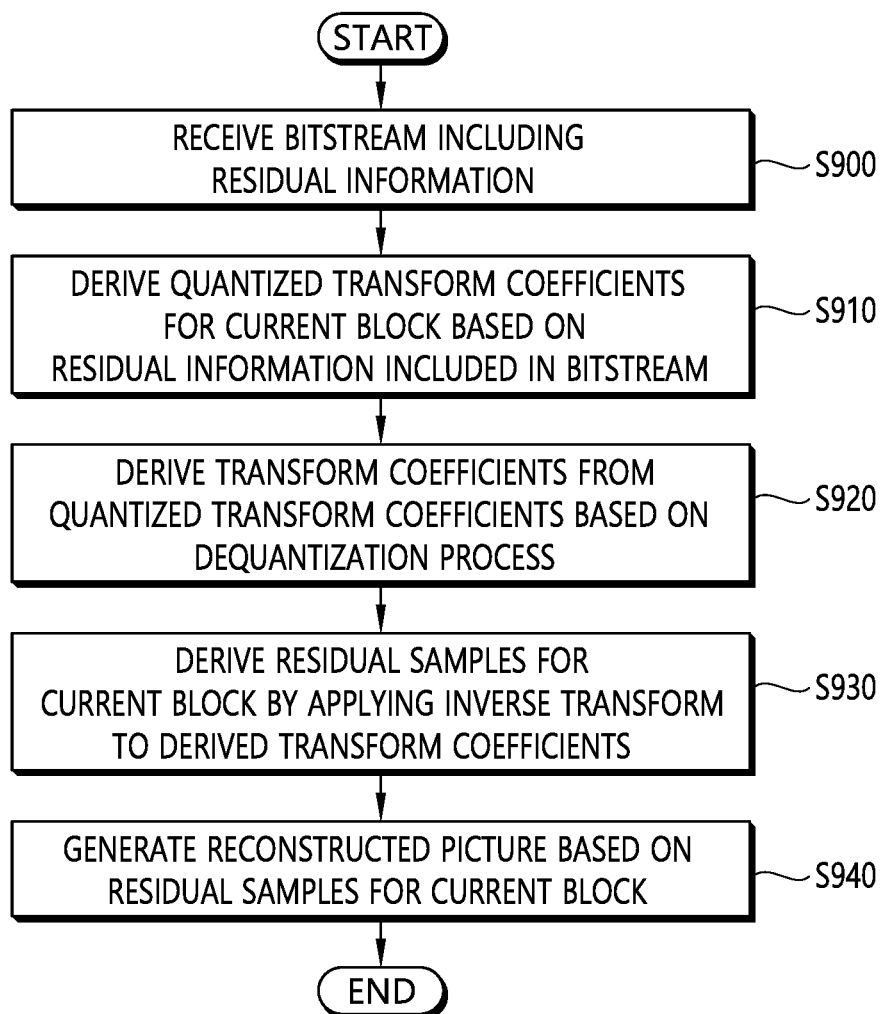
FIG. 9 is a flowchart showing operation of a decoding apparatus according to an example.
Figure 10:
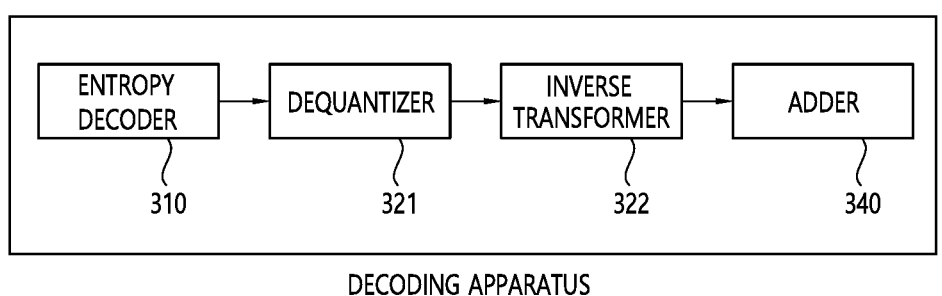
FIG. 10 is a block diagram showing a configuration of a decoding apparatus according to an example.

The encoding apparatus according to FIGS. 7 and 8 may perform an operation corresponding to that of a decoding apparatus according to FIGS. 9 and 10. Therefore, operations of the decoding apparatus to be described later in FIGS. 9 and 10 can be likely applied to the encoding apparatus according to FIGS. 7 and 8.

Each of steps disclosed in FIG. 7 may be performed by the encoding apparatus 200 disclosed in FIG. 2. More specifically, S700 may be performed by the subtractor 231 disclosed in FIG. 2; S710, the transformer 232 disclosed in FIG. 2; S720, the quantizer 233 disclosed in FIG. 2; and S730, the entropy encoder 240 disclosed in FIG. 2. Further, operations according to S700 to S730 are based on some of contents described above in FIGS. 4 to 6. Therefore, an explanation for the specific content duplicated with contents described above in FIGS. 2, and 4 to 6 will be omitted or made briefly.

As shown in FIG. 8, the encoding apparatus according to an example may include the subtractor 231, the transformer 232, the quantizer 233, and the entropy encoder 240. However, according to circumstances, all the components shown in FIG. 8 may not be essential components of the encoding apparatus, and the encoding apparatus may be embodied by more or less components than those shown in FIG. 8.

In the encoding apparatus according to an example, each of the subtractor 231, the transformer 232, the quantizer 233, and the entropy encoder 240 may be embodied by a separate chip, or at least two or more components may be embodied through a single chip.

The encoding apparatus according to an example may derive residual samples for a current block (S700). More specifically, the subtractor 231 of the encoding apparatus may derive residual samples for the current block.

The encoding apparatus according to an example may derive transform coefficients for the current block by transforming the residual samples for the current block (S710). More specifically, the transformer 232 of the encoding apparatus may derive transform coefficients for the current block by transforming the residual samples for the current block.

The encoding apparatus according to an example may derive quantized transform coefficients from the transform coefficients based on a quantization process (S720). More specifically, the quantizer 233 of the encoding apparatus may derive quantized transform coefficients from the transform coefficients based on a quantization process.

The encoding apparatus according to an example may encode residual information including information on the quantized transform coefficients (S730). More specifically, the encoder 240 of the encoding apparatus may encode the residual information including information on the quantized transform coefficients.

In an example, each of the transform coefficients for the current block may be related to a high frequency transform coefficient region consisting of transform coefficient 0, or a low frequency transform coefficient region including at least one significant transform coefficient.

In an example, the residual information includes last significant coefficient prefix information and last significant coefficient suffix information on position of last non-zero transform coefficient among the transform coefficients for the current block.

In an example, the position of the last non-zero transform coefficient may be based on prefix codeword, which represents the last significant coefficient prefix information, and the last significant coefficient suffix information.

In an example, a maximum length of the prefix codeword may be determined based on a size of the low frequency transform coefficient region.

According to the encoding apparatus and the operation method of the encoding apparatus of FIGS. 7 and 8, the encoding apparatus may derive the residual samples for the current block (S700), derive the transform coefficients for the current block by transforming the residual samples for the current block (S710), derive the quantized transform coefficients from the transform coefficients based on a quantization process (S720), and encode the residual information including the information on the quantized transform coefficients (S730), wherein each of the transform coefficients for the current block may be related to a high frequency transform coefficient region consisting of transform coefficient 0, or a low frequency transform coefficient region including at least one significant transform coefficient, the residual information may include last significant coefficient prefix information and last significant coefficient suffix information on position of a last non-zero transform coefficient among the transform coefficients for the current block, the position of the last non-zero transform coefficient may be based on prefix codeword, which represents the last significant coefficient prefix information, and the last significant coefficient suffix information, and a maximum length of the prefix codeword may be determined based on a size of the low frequency transform coefficient region. That is, according to the present disclosure, when the high frequency zeroing is applied, by performing binarization on a syntax element based on the size of the high frequency zeroing region (more correctly, a region to which the high frequency zeroing is not applied), it is possible to perform coding more efficiently, and improve the throughput of CABAC by reducing the number of context-coded bins.

FIG. 9 is a flowchart showing operation of a decoding apparatus according to an example, and FIG. 10 is a block diagram showing a configuration of a decoding apparatus according to an example.

Each of steps disclosed in FIG. 9 may be performed by the decoding apparatus 300 disclosed in FIG. 3. More specifically, S900 and S910 may be performed by the entropy decoder 310 disclosed in FIG. 3; S920, the dequantizer 321 disclosed in FIG. 3; S930, the inverse transformer 322 disclosed in FIG. 3; and S940, the adder 340 disclosed in FIG. 3. Further, operations according to S900 to S940 are based on some of contents described above in FIGS. 4 to 6. Therefore, an explanation for the specific content duplicated with contents described above in FIGS. 3 to 6 will be omitted or made briefly.

As shown in FIG. 10, the decoding apparatus according to an example may include the entropy decoder 310, the dequantizer 321, the inverse transformer 322, and the adder 340. However, according to circumstances, all the components shown in FIG. 10 may not be essential components of the decoding apparatus, and the decoding apparatus may be embodied by more or less components than those shown in FIG. 10.

In the decoding apparatus according to an example, each of the entropy decoder 310, the dequantizer 321, the inverse transformer 322, and the adder 340 may be embodied by a separate chip, or at least two or more components may be embodied through a single chip.

The decoding apparatus according to an example may receive a bitstream including residual information (S900). More specifically, the entropy decoder 310 of the decoding apparatus may receive a bitstream including residual information.

The decoding apparatus according to an example may derive quantized transform coefficients for a current block based on residual information included in a bitstream (S910). More specifically, the entropy decoder 310 of the decoding apparatus may derive the quantized transform coefficient for the current block based on the residual information included in the bitstream.

The decoding apparatus according to an example may derive transform coefficients from the quantized transform coefficients based on a dequantization process (S920). More specifically, the dequantizer 321 of the decoding apparatus may derive the transform coefficients from the quantized transform coefficients based on the dequantization process.

The decoding apparatus according to an example may derive residual samples for the current block by applying inverse transform to the derived transform coefficients (S920). More specifically, the inverse transformer 322 of the decoding apparatus may derive the residual samples for the current block by applying the inverse transform to the derived transform coefficients.

The decoding apparatus according to an example may generate a reconstructed picture based on the residual sample for the current block (S940). More specifically, the adder 340 of the decoding apparatus may generate the reconstructed picture based on the residual sample for the current block.

In an example, a unit of the current block may be a transform block TB.

In an example, each of the transform coefficients for the current block may be related to a high frequency transform coefficient region consisting of transform coefficient 0, or a low frequency transform coefficient region including at least one significant transform coefficient.

In an example, the residual information may include last significant coefficient prefix information and last significant coefficient suffix information on position of last non-zero transform coefficient among the transform coefficients for the current block.

In an example, the position of the last non-zero transform coefficient may be determined based on prefix codeword, which represents the last significant coefficient prefix information, and the last significant coefficient suffix information.

In an example, a maximum length of the prefix codeword may be determined based on a size of the low frequency transform coefficient region. The maximum length of the prefix codeword may be expressed as cMax.

In an example, the size of the low frequency transform coefficient region may be determined based on a width and height of the low frequency transform coefficient region.

In an example, the last significant coefficient prefix information may include x-axis prefix information and y-axis prefix information, and the prefix codeword may be a codeword for the x-axis prefix information or a codeword for the y-axis prefix information.

In an example, the x-axis prefix information may be expressed as last_sig_coeff_x_prefix; the y-axis prefix information may be expressed as last_sig_coeff_y_prefix; and the position of the last non-zero transform coefficient may be expressed as (LastSignificantCoeffX, LastSignificantCoeffY).

In an example, the maximum length of the codeword, which indicates the x-axis prefix information, may be determined to be 9 based on determination that the width of the low frequency transform coefficient region is 32.

In an example, the maximum length of the codeword, which indicates the y-axis prefix information, may be determined to be 9 based on determination that the height of the low frequency transform coefficient region is 32.

In an example, a maximum binarized value of the codeword for the x-axis prefix information may be determined to be 111111111 based on determination that a width of the current block is greater than 32, and that the width of the low frequency transform coefficient region is 32.

In an example, a maximum binarized value of the codeword for the y-axis prefix information may be determined to be 111111111 based on determination that a height of the current block is greater than 32, and that the height of the low frequency transform coefficient region is 32.

In an example, a maximum length of the codeword for the x-axis prefix information may be determined based on Equation 5 below.

$$c\text{Max}_x = (\log_2(\min(W_1, W_2)) \gg 1) - 1 \quad \text{[Equation 5]}$$

In Equation 5, $c\text{Max}_x$ may be the maximum length of the codeword for the x-axis prefix information; the $W_1$, a width of the current block; and the $W_2$, a width of the low frequency transform coefficient region.

In an example, the width of the low frequency transform coefficient region may be 32, and the maximum length of the codeword for the x-axis prefix information may be determined based on Equation 6 below.

$$c\text{Max}_x = (\min(\log_2 W_1, 5)) \ll 1) - 1 \quad \text{[Equation 6]}$$

In Equation 6, $c\text{Max}_x$ may be the maximum length of the codeword for the x-axis prefix information, and the $W_1$ may be a width of the current block.

In an example, a maximum length of the codeword for the y-axis prefix information may be determined based on Equation 7 below.

$$c\text{Max}_y = (\log_2(\min(H_1, H_2)) \ll 1) - 1 \quad \text{[Equation 7]}$$

In Equation 7, cMaxy may be the maximum length of the codeword for the y-axis prefix information; the $H_1$, a height of the current block; and the $H_2$, a height of the low frequency transform coefficient region.

In an example, the height of the low frequency transform coefficient region may be 32, and the maximum length of the codeword for the y-axis prefix information may be determined based on Equation 8 below.

$$c\text{Max}_y = (\min(\log_2 H_1, 5)) \ll 1) - 1 \quad \text{[Equation 8]}$$

In Equation 8, cMaxy may be the maximum length of the codeword for the x-axis prefix information, and the $H_1$ may be a height of the current block.

In an example, the prefix codeword may be a truncated Rice code based on a truncated Rice binarization process.

In an example, the current block may be a square block or a non-square block. The width of the low frequency transform coefficient region may be determined to be 32 based on determination that the width of the current block is 64, and the height of the low frequency transform coefficient region may be determined to be 32 based on determination that the height of the current block is 64.

In an example, the size of the low frequency transform coefficient region may be one of 32×16, 16×32, 16×16 or 32×32.

In an example, the size of the low frequency transform coefficient region may be determined based on a size of the current block.

In an example, the residual information may include information on the size of the low frequency transform coefficient region.

In an example, the size of the current block may be 64×64; the size of the low frequency transform coefficient region, 32×32; and a maximum length of the prefix codeword, 9.

According to the decoding apparatus and the operation method of the decoding apparatus of FIGS. 9 and 10, the decoding apparatus may receive a bitstream including residual information (S900), derive quantized transform coefficients for a current block based on the residual information included in the bitstream (S910), derive transform coefficients from the quantized transform coefficients based on a dequantization process (S920), and derive residual samples for the current block by applying inverse transform to the derived transform coefficients (S930), and generate a reconstructed picture based on residual samples for the current block (S940), wherein each of the transform coefficients for the current block may be related to a high frequency transform coefficient region consisting of transform coefficient 0, or a low frequency transform coefficient region including at least one significant transform coefficient, the residual information may include last significant coefficient prefix information and last significant coefficient suffix information on position of last non-zero transform coefficient among the transform coefficients for the current block, the position of the last non-zero transform coefficient may be determined based on prefix codeword, which represents the last significant coefficient prefix information, and the last significant coefficient suffix information, and a maximum length of the prefix codeword may be determined based on a size of the low frequency transform coefficient region. That is, according to the present disclosure, when the high frequency zeroing is applied, by performing binarization on a syntax element based on the size of the high frequency zeroing region (more correctly, a region to which the high frequency zeroing is not applied), it is possible to perform coding more efficiently, and improve the throughput of CABAC by reducing the number of context-coded bins.

In an example, the residual coding process described above in FIGS. 4 to 10 may be based on the content of English specification below.

Abstract

In this proposal, the binarization of last significant coefficient position is modified to reduce the maximum number of context coded bins. Specifically, the number of context coded bins for large block (i.e., 64×64, 64×N, N×64) in worst case scenario is reduced from 11 to 9. Experimental results show 0.01%, 0%, and −0.02% BD-rate reductions on Y, Cb, and Cr components, respectively, compared to VTM3.0 in all-intra configuration, and 0.01%, −0.01%, and −0.01% BD-rate reductions in random access configuration.

1 Introduction

It is known that large block partitions typically present less residuals and the energy is more concentrated in low-frequency coefficients in the transform domain. In VTM3.0 [1], high frequency transform coefficients are zeroed out for the transform blocks with size (width or height, or both width and height) equal to 64. Thus, for a W×H transform block, where W indicates the block width and H the block height, only the top-left (W==64?32:W)×(H==64?32:H) transform coefficients are retained.

In [1], the prefix last_sig_coeff_x_prefix and last_sig_coeff_y_prefix are both context coded using truncated Rice binarization with cMax=(log 2TbSize<<1)−1. Here, if the syntax element to be parsed is last_sig_coeff_x_prefix, log 2TbSize is set equal to log 2TbWidth and otherwise, log 2TbSize is set equal to log 2TbHeight. That is, the maximum possible magnitude is determined by the transform block width or height. In the worst case scenario, the number of the bins that use context modelling is equal to 11. Table 7 shows the binarization for W=64 or H=64 in VTM3.0, wherein X means 0 or 1.

TABLE 7

| Magnitude of last position component | last_sig_coeff_x_prefix or last_sig_coeff_y_prefix (context coded bin) | last_sig_coeff_x_suffix or last_sig_coeff_y_suffix (bypass bin) |
|---|---|---|
| 0 | 0 | |
| 1 | 10 | |
| 2 | 110 | |
| 3 | 1110 | |
| 4, 5 | 11110 | X |
| 6, 7 | 111110 | X |
| 8~11 | 1111110 | XX |
| 12~15 | 11111110 | XX |
| 16~23 | 111111110 | XXX |
| 24~11 | 1111111110 | XXX |
| 32~47 | 11111111110 | XXXX |
| 48~63 | 11111111111 | XXXX |

2. Proposed Method

This contribution is proposed on top of JVET-M0250 [2]. In the proposed method, whether the current coefficient group belongs to the high-frequency zeroing region is checked. Using this information, the unnecessary coded_sub_block_flag (CSBF) coding for the high-frequency zeroing region can be skipped.

In one embodiment, CSBF coding method considering the high-frequency zeroing region may be proposed. If a first condition for Last or first coefficient group is satisfied, the value of CSBF may be inferred to 1. If the first condition for last or first coefficient group is not satisfied, a second condition for high-frequency zeroing region is checked. If the second condition for high-frequency zeroing region is satisfied, there is no CSBF coding. If the second condition for high-frequency zeroing is not satisfied, context index is derived and CSBF coding is performed.

A last position coding scheme is proposed for large block-size transforms. Compared to VTM3.0, the proposed coding scheme uses less context coded bins in the worst case scenario. The codeword in the proposed scheme still starts with a truncated Rice code and followed by a fixed length code. After high-frequency zeroing, for a W×H transform block, only the top-left min(W, 32)×min(H, 32) transform coefficients are kept. Thus, the maximum possible codeword length of the prefix last_sig_coeff_x_prefix or last_sig_coeff_y_prefix is derived as:

$$cMax=(min(log\ 2TbSize,5)<<1)-1.$$

Table 8 shows the binarization for W=64 or H=64, wherein X means 0 or 1. Here, the different parts are emphasized.

TABLE 8

| Magnitude of last position component | last_sig_coeff_x_prefix or last_sig_coeff_y_prefix (context coded bin) | last_sig_coeff_x_suffix or last_sig_coeff_y_suffix (bypass bin) |
|---|---|---|
| 0 | 0 | |
| 1 | 10 | |
| 2 | 110 | |

TABLE 8-continued

| Magnitude of last position component | last_sig_coeff_x_prefix or last_sig_coeff_y_prefix(context coded bin) | last_sig_coeff_x_suffix or last_sig_coeff_y_suffix(bypass bin) |
|---|---|---|
| 3 | 1110 | |
| 4, 5 | 11110 | X |
| 6, 7 | 111110 | X |
| 8~11 | 1111110 | XX |
| 12~15 | 11111110 | XX |
| 16~23 | 111111110 | XXX |
| 24~31 | 111111111 | XXX |
| 32~47 | N/A | N/A |
| 48~63 | N/A | N/A |

TABLE 9

| Magnitude of last position componentt | VTM3.0 | Proposed method |
|---|---|---|
| 0 | 1 | 1 |
| 1 | 2 | 2 |
| 2 | 3 | 3 |
| 3 | 4 | 4 |
| 4, 5 | 5 | 5 |
| 6, 7 | 6 | 6 |
| 8~11 | 7 | 6 |
| 12~15 | 8 | 8 |
| 16~23 | 9 | 9 |
| 24~31 | 10 | 9 |
| 32~47 | 11 | N/A |
| 48~63 | 11 | N/A |

Table 9 shows comparison of codeword length for the prefix (context coded bins) when W=64 or H=64 and VTM3.0. The context coded bins can be as long as 9 in the proposed method, while it is up to 11 bins in VTM3.0. Note that when the magnitude of the last position component in the range of 24-31, the number of context coded bins is reduced from 10 to 9.

3. Experimental Results

The proposed method has been implemented on the VTM3.0 software. The simulations were performed following the common test conditions defined in JVET-L1010 [3]. In every case, the anchor is the VTM3.0 software. Encoding time and decoding time come from the cross-check results [4]. Table 10 shows Experimental results for all-intra (AI) test condition; anchor is VTM3.0

TABLE 10

| | All Intra Main10 Over VTM-3.0 | | | | |
|---|---|---|---|---|---|
| | Y | U | V | EncT | DecT |
| Class A1 | 0.03% | −0.07% | 0.03% | 100% | 101% |
| Class A2 | 0.02% | 0.00% | −0.03% | 100% | 100% |
| Class B | 0.01% | 0.05% | −0.02% | 100% | 102% |
| Class C | 0.00% | 0.01% | −0.03% | 100% | 101% |
| Class E | 0.02% | −0.02% | −0.03% | 100% | 99% |
| Overall | 0.01% | 0.00% | −0.02% | 100% | 101% |
| Class D | 0.00% | 0.01% | −0.01% | 100% | 100% |
| Class F | −0.01% | 0.03% | 0.02% | 100% | 99% |

Table 11 shows Experimental results for random-access (RA) test condition; anchor is VTM3.0

TABLE 11

| | Random access Main10 | | | | |
|---|---|---|---|---|---|
| | Over VTM-3.0 | | | | |
| | Y | U | V | EncT | Dec T |
| Class A1 | 0.05% | −0.09% | 0.00% | | |
| Class A2 | 0.01% | 0.07% | 0.03% | | |
| Class B | −0.01% | −0.02% | −0.04% | 100% | 100% |
| Class C | 0.00% | 0.02% | −0.01% | 99% | 100% |
| Class E | | | | | |
| Overall | 0.01% | −0.01% | −0.01% | | |
| Class D | 0.00% | 0.03% | 0.06% | 100% | 100% |
| Class F | −0.01% | −0.03% | −0.07% | 100% | 99% |

4. Reference

[1] B. Bross, et al., "Versatile Video Coding (Draft 3)," Joint Video Exploration Team (JVET) of ITU-T SG 16 WP 3 and ISO/IEC JTC1/SC 29/WG 11 JVET-L1001, 12$^{th}$ meeting, Macao, Conn., 3-12 Oct. 2018.

[2] J. Choi, et al., "Non-CE7: Simplified CSBF coding for large block-size transforms," Joint Video Exploration Team (JVET) of ITU-T SG 16 WP 3 and ISO/IEC JTC1/SC 29/WG 11 JVET-M0250, 13$^{th}$ meeting, Marrakech, Mass., 9-18 Jan. 2019.

[3] F. Bossen, et al., "JVET common test conditions and software reference configurations for SDR video" Joint Video Exploration Team (JVET) of ITU-T SG 16 WP 3 and ISO/IEC JTC1/SC 29/WG 11 JVET-L1010, 12th Meeting, Macao, Conn., 3-12 Oct. 2018.

[4] H. Schwarz, "Crosscheck of JVET-M0251 (Non-CE7: Last position coding for large block-size transforms)," Joint Video Exploration Team (JVET) of ITU-T SG 16 WP 3 and ISO/IEC JTC1/SC 29/WG 11 JVET-M0646, 13$^{th}$ meeting, Marrakech, Mass., 9-18 Jan. 2019.

5. Patent Rights Declaration(s)

LG Electronics Inc. may have current or pending patent rights relating to the technology described in this contribution and, conditioned on reciprocity, is prepared to grant licenses under reasonable and non-discriminatory terms as necessary for implementation of the resulting ITU-T Recommendation I ISO/IEC International Standard (per box 2 of the ITU-T/ITU-R/ISO/IEC patent statement and licensing declaration form).

6. Specification

TABLE 12

| residual_coding( x0, y0, log2TbWidth, log2TbHeight, cIds ) { | Descriptor |
|---|---|
| if( transform_skip_enabled_flag && | |
| ( cIdx != 0 \|\|    tu_mts_flag[ x0 ][ y0 ] == 0 ) && | |
| ( log2TbWidth <= 2 ) && ( log2TbHeight <= 2 ) ) | |
| transform_skip_flag[ x0 ][ y0 ][ cIdx ] | ae(v) |
| last_sig_coeff_x_prefix | ae(v) |
| last_sig_coeff_y_prefix | ae(v) |
| if( last_sig_coeff_x_prefix > 3) | |
| last_sig_coeff_x_suffix | ae(v) |
| if( last_sig_coeff_y_prefix > 3 ) | |
| last_sig_coeff_y_suffix | ae(v) |
| log2SbSize = ( Min( log2TbWidth, log2TbHeight) < 2 ? 1 : 2 ) | |
| numSbCoeff = 1 << ( logSbSize << 1 ) | |
| lastScanPos = numSbCoeff | |
| log2TbWidth = Min( log2TbWidth, 5) | |
| log2TbHeight = Min( log2TbHeight, 5) | |
| lastSubBlock = ( 1 << ( log2TbWtdth + log2TbHeight − 2 * log2Size ) ) −1 | |
| do { | |
| if( lastScanPos == 0 ) { | |
| lastScanPos = numSbCoeff | |
| lastSubBlock− − | |
| } | |
| lastScanPos− − | |
| xS = DiagScanOrder[ log2TbWidth −log2SbSize ][ log2TbHeight −log2SbSize ] [ lastSubBlock ][ 0 ] | |
| yS = DiagScanOrder[ log2TbWidth −log2SbSize ][ log2TbHeight −log2SbSize ] [ lastSubBlock ][ 1 ] | |
| xC = ( xS << log2SbSize) + DiagScanOrder[ log2SbSize ][ log2SbSize ][ lastScanPos ][ 0 ] | |
| yC = ( yS << log2SbSize ) + DiagScanOrder[ log2SbSize ][ log2SbSize ][ lastScanPos ][ 1 ] | |
| } while( ( xC != LastSignificantCoeffX ) \|\| ( yC != LastSignicantCoeffY ) ) | |
| numSigCoeff = 0 | |
| QState = 0 | |
| for( i = lastSubBlock; i >= 0; i− − ) { | |
| startQStateSb = QState | |
| xS = DiagScanOrder[ log2TbWidth − log2SbSize ][ log2TbHeight −log2SbSize ] [ lastSubBlock ][ 0 ] | |
| yS = DiagScanOrder[ log2TbWidth − log2SbSize ][ log2TbHeight −log2SbSize ] [ lastSubBlock ][ 1 ] | |
| inferSbDcSigCoeffFlag = 0 | |
| if( ( i < lastSubBlock ) && ( i > 0 ) ) { | |
| coded_sub_block_flag[ xS ][ yS ] | ae(v) |
| inferSbDcSigCoeffFlag = 1 | |
| } | |
| firstSigScanPosSb = numSbCoeff | |
| lastSigScanPosSb = −1 | |
| remBinsPass1 = ( log2SbSize < 2 ? 6 : 28 ) | |
| remBinsPass2 = ( log2SbSize < 2 ? 2 : 4 ) | |
| firstPosMode0 = ( i == lastSubBlock ? lastScanPos − 1 : numSbCorff −1 ) | |
| firstPosMode1 = −1 | |
| firstPosMode2 = −1 | |
| for( n = ( i == firstPosMode0; n >= 0 && remBinsPass1 >= 3; n− − ) { | |
| xC = ( xS << log2SbSize ) + DiagScanOrder[ log2SbSize ][ log2SbSize ][ n ][ 0 ] | |
| yC = ( yS << log2SbSize ) + DiagScanOrder[ log2SbSize ][ log2SbSize ][ n ][ 1 ] | |
| if( coded_sub_block_flag[ xS ][ yS ] && ( n > 0 \|\| (inferSbDcSigCoeffFlag ) ) { | |
| sig_coeff_flag[ xC ][ yC ] | ae(v) |
| remBinsPass1− − | |
| if( sig_coeff_flag[ xC ][ yC ] ) | |
| inferSbDcSigCoeffFlag = 0 | |
| } | |
| if(sig_coeff_flag[ XC ][ yC ] ) { | |
| numSigCoeff++ | |
| abs_level_gt1_flag[ n ] | ae(v) |
| remBinsPass1− − | |
| if( abs_level_gt1_flag[ n ] ) { | |
| par_level_flag[ n ] | ae(v) |
| remBinsPass1− − | |
| if( remBinsPass2 > 0 ) { | |
| remBinsPass2− − | |
| if( remBinsPass2 == 0 ) | |
| firstPosMode1 = n − 1 | |

TABLE 12-continued

| residual_coding( x0, y0, log2TbWidth, log2TbHeight, cIds ) { | Descriptor |
|---|---|
|     } | |
|   } | |
|   if( lastSigScanPosSb = = −1) | |
|     lastSigScanPosSb = n | |
|     firstSigScanPosSb = n | |
|   } | |
|   AbsLevelPass1[ xC ][ yC ] = sig_coeff_flag[ xC ][ yC ] + par_level_flag[ n ] + abs_level_gt1_flag[ n ] | |
|   if( dep_quant_enabled_flag ) | |
|     QState = QStateTransTable[ QState ][ AbsLevelPass1[ xC ][ yC ] & 1 ] | |
|   if( remBinsPass1 < 3) | |
|     firstPosMode2 = n − 1 | |
|   } | |
|   if( firstPosMode1 < firstPosMode2 ) | |
|     firstPosMode1 = firstPosMode2 | |
|   for( n = numSbCoeff − 1; n >= firstPosMode2; n−) | |
|     if( abs_level_gt1_flag[ n ] ) | |
|       abs_level_gt3_flag[ n ] | ae(v) |
|   for( n = numSbCoeff − 1; n >= firstPosMode1; n−) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     if( abs_level_gt3_flag[ n ]) | |
|       abs_remainder[ n ] | ae(v) |
|     AbsLevel[ xC ][ yC ] = AbsLevelPass1[ xC ][ yC ] + 2 * ( abs_level_gt3_flag[ n ] + abs_remainder[ n ] ) | |
|   } | |
|   for( n = firstPosMode1; n > firstPosMode2; n− −) { | |
|     xC = ( xS << log2SbSize) + DiagScanOrder[ log2SbSize ][ log2SbSize ][ n] [ 0 ] | |
|     yC = ( yS << log2SbSize) + DiagScanOrder[ log2SbSize ][ log2SbSize ][ n] [ 1 ] | |
|     if( abs_leveel_gt1_flag[ n ] ) | |
|       abs_remainder[ n ] | ae(v) |
|     AbsLevet[ xC ][ yC ] = AbsLevelPass1[ xC ][ yC ] + 2 * abs_remainder[ n ] | |
|   } | |
|   for( n = firstPosMode2; n >= 0; n − −) { | |
|     xC = ( xS << log2SbSize) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     dec_abs_level[ n ] | ae(v) |
|     if(AbsLevel[ xC ][ yC ] > 0) | |
|       firstSigScanPosSb = n | |
|     if( dep_quant_enabled_flag ) | |
|       QState = QStateTransTable[ QState ][ AbsLevel[ xC ][ yC ] & 1 ] | |
|   } | |
|   if( dep_quant_enabled_flag | | !sign_data_hiding_enabled_flag ) | |
|     signHidden = 0 | |
|   else | |
|     signHidden = ( lastSigScanPosSb − firstSigScanPosSb > 3 ? 1 : 0 ) | |
|   for( n = numSbCoeff − 1; n >= 0; n− ) { | |
|     xC = (xS << log2SbSize ) + DiagScanOrder[ log2SbSize ][ log2SbSiz ][ n ][ 0 ] | |
|     yC = (yS << log2SbSize ) + DiagScanOrder[ log2SbSize ][ log2SbSize ][ n ][ 1 ] | |
|     if( sig_coeff_flag[ xC ][ yC ] && ( !signHidden | | ( n != firstSigScanPosSb ) ) ) | |
|       coeff_sign_flag[ n ] | ae(v) |
|   } | |
|   if( dep_quant_enabled_flag) { | |
|     QState = startQStateSb | |
|     for( n = numSbCoeff − 1; n >= 0; n−) { | |
|       xC = (xS << log2SbSize ) + DiagScanOrder[ log2SbSize ][ log2SbSize ][ n ][ 0 ] | |
|       yC = (yS << log2SbSize ) + DiagScanOrder[ log2SbSize ][ log2SbSize ][ n ][ 1 ] | |
|       if(sig_coeff_flag[ xC ][ yC ] ) | |
|         TransCoeffLevel[ x0 ][ y0 ][ cIdx ][ xC ][ yC ] = ( 2 * AbsLevel[ xC ][ yC ] − (QState > 1 1 : 0) ) *( 1 − 2 * coeff_sign_flag[ n ] ) | |
|       QState = QStateTransTable[ QState ][ par_level_flag[ n ] ] | |
|   } else { | |
|     sumAbsLevel = 0 | |
|     for( n = numSbCoeff − 1; n >= 0; n−) { | |
|       xC = ( xS << log2SbSize ) + | |

TABLE 12-continued

```
residual_coding( x0, y0, log2TbWidth, log2TbHeight, cIds ) {                    Descriptor
DiagScanOrder[ log2SbSiz ][ log2SbSize ][ n ][ 0 ]
yC = ( yS << log2SbSize ) +
DiagScanOrder[ log2SbSiz ][ log2SbSize ][ n ][ 1 ]
if( sig_coeff_flag[ xC ][ yC ] ) {
TransCoeffLevel[ x0) ][ y0 ][ cIdx ][ xC ][ yC ] =
AbsLevel[ xC ][ yC ] * (1 – 2 * coeff_sign_flag[ n ] )
if( signHidden ) {
sumAbsLevel += AbsLevel[ xC ][ yC ]
if( ( n = = firstSigScanPosSb) && (sumAbsLevel % 2 ) = = 1 ) )
TransCoeffLevel[ x0 ][ y0 ][ cIdx ][ xC ][ yC ] =
–TransCoeffLevel[ x0 ][ y0 ][ cIdx ][ xC ][ yC ]
}
}
}
}
}
}
if(  tu_mts_flag[ x0 ][ y0 ] && ( cIdx  = =  0 ) )
mts_idx[ x0 ][ y0 ][ cIdx ]                                                     ae(v)
}
``` last_sig_coeff_x_prefix specifies the prefix of the column position of the last significant coefficient in scanning order within a transform block. The values of last_sig_coeff_x_prefix shall be in the range of 0 to (Min(log 2TbWidth, 5)<<1)−1, inclusive.

last_sig_coeff_y_prefix specifies the prefix of the row position of the last significant coefficient in scanning order within a transform block. The values of last_sig_coeff_y_prefix shall be in the range of 0 to (Min(log 2TbHeight, 5)<<1)−1, inclusive.

Table 13 below shows syntax elements and associated binarizations.

TABLE 13

| Syntax structure | Syntax element | Binarization | |
|---|---|---|---|
| | | Process | Input parameters |
| tile_group_data( ) | end_of_tile_group_flag | FL | cMax = 1 |
| coding_tree_unit( ) | alf_ctb_flag[ ][ ][ ] | FL | cMax = 1 |
| sao( ) | sao_merge_left_flag | FL | cMax = 1 |
| | sao_merge_up_flag | FL | cMax = 1 |
| | sao_type_idx_luma | TR | cMax = 2, cRiceParam = 0 |
| | sao_type_idx_chroma | TR | cMax = 2, cRiceParam = 0 |
| | sao_offset_abs[ ][ ][ ][ ] | TR | cMax = ( 1 << ( Min( bitDepth, 10) − 5 ) ) − 1, cRiceParam = 0 |
| | sao_offset_sign[ ][ ][ ][ ] | FL | cMax = 1 |
| | sao_band_position[ ][ ][ ] | FL | cMax = 31 |
| | sao_eo_class_luma | FL | cMax = 3 |
| | sao_eo_class_chroma | FL | cMax = 3 |
| coding_quadtree( ) | qt_split_cu_flag[ ][ ] | FL | cMax = 1 |
| multi_type_tree( ) | mtt_split_cu_flag | FL | cMax = 1 |
| | mtt_split_cu_vertical_flag | FL | cMax = 1 |
| | mtt_split_cu_binary_flag | FL | cMax = 1 |
| coding_unit( ) | cu_skip_flag[ ][ ] | FL | cMax = 1 |
| | pred_mode_flag | FL | cMax = 1 |
| | pcm_flag[ ][ ] | FL | cMax = 1 |
| | intra_luma_ref_idx[ ][ ] | TR | cMax = 2, cRiceParam = 0 |
| | intra_luma_mpm_flag[ ][ ] | FL | cMax = 1 |
| | intra_luma_mpm_idx[ ][ ] | TR | cMax = 5, cRiceParam = 0 |
| | intra_luma_mpm_remainder[ ][ ] | TB | cMax = 60 |
| | intra_chroma_pred_mode[ ][ ] | 9.5.3.7 | — |
| | merge_flag[ ][ ] | FL | cMax = 1 |
| | inter_pred_idc[ x0 ][ y0 ] | 9.5.3.8 | cbWidth, cbHeight |
| | inter_affine_flag[ ][ ] | FL | cMax = 1 |
| | cu_affine_type_flag[ ][ ] | FL | cMax = 1 |
| | ref_idx_l0[ ][ ] | TR | cMax = num_ref_idx_l0_active_minus1, cRiceParam = 0 |
| | mvp_l0_flag[ ][ ] | FL | cMax = 1 |
| | ref_idx_l1[ ][ ] | TR | cMax = num_ref_idx_l1_active_minus1, cRiceParam = 0 |

TABLE 13-continued

| Syntax structure | Syntax element | Binarization Process | Input parameters |
|---|---|---|---|
| | mvp_l1_flag[ ][ ] | FL | cMax = 1 |
| | avmr_flag[ ][ ] | FL | cMax = 1 |
| | amvr_4pel_flag[ ][ ] | FL | cMax = 1 |
| | gbi_idx[ ][ ] | TR | cMax = NoBackwardPredFlag ? 4 : 2 |
| | cu_cbf | FL | cMax = 1 |
| merge_data( ) | mmvd_flag[ ][ ] | FL | cMax = 1 |
| | mmvd_merge_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | ciip_luma_mpm_flag[ ][ ] | FL | cMax = 1 |
| | ciip_luma_mpm_idx[ ][ ] | TR | cMax = 2, cRiceParam = 0 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | merge_triangle_flag[ ][ ] | FL | cMax = 1 |
| | merge_triangle_idx[ ][ ] | EG1 | — |
| | merge_idx[ ][ ] | TR | cMax = MaxNumMergeCand − 1, cRiceParam = 0 |
| mvd_coding( ) | abs_mvd_greater0_flag[ ] | FL | cMax = 1 |
| | abs_mvd_greater1_flag[ ] | FL | cMax = 1 |
| | abs_mvd_minus2[ ] | EG1 | — |
| | mvd_sign_flag[ ] | FL | cMax = 1 |
| transform_unit( ) | tu_cbf_luma[ ][ ][ ] | FL | cMax = 1 |
| | tu_cbf_cb[ ][ ][ ] | FL | cMax = 1 |
| | tu_cbf_cr[ ][ ][ ] | FL | cMax = 1 |
| | cu_qp_delta_abs | 9.5.3.9 | — |
| | cu_qp_delta_sign_flag | FL | cMax = 1 |
| | tu_mts_flag[ ][ ] | FL | cMax = 1 |
| residual_coding( ) | transform_skip_flag[ ][ ][ ] | FL | cMax = 1 |
| | last_sig_coeff_x_prefix | TR | cMax = ( Min( log2TbWidth, 5 ) << 1 ) − 1, cRiceParam = 0 |
| | last_sig_coeff_y_prefix | TR | cMax = ( Min( log2TbHeight, 5 ) << 1 ) − 1, cRiceParam = 0 |
| | last_sig_coeff_x_suffix | FL | cMax = ( 1 << ( ( last_sig_coeff x_prefix >> 1 ) − 1 ) − 1 ) |
| | last_sig_coeff_y_suffix | FL | cMax = ( 1 << ( ( last_sig_coeff y_prefix >> 1 ) − 1 ) − 1 ) |
| | coded_sub_block_flag[ ][ ] | FL | cMax = 1 |
| | sig_coeff_flag[ ][ ] | FL | cMax = 1 |
| | par_level_flag[ ] | FL | cMax = 1 |
| | abs_level_gt1_flag[ ] | FL | cMax = 1 |
| | abs_level_gt3_flag[ ] | FL | cMax = 1 |
| | abs_remainder[ ] | 9.5.3.10 | cIdx, current sub-block index i, x0, y0 |
| | dec_abs_level[ ] | 9.5.3.11 | cIdx, x0, y0, xC, yC, log2TbWidth, log2TbHeight |
| | coeff_sign_flag[ ] | FL | cMax = 1 |
| | mts_idx[ ][ ][ ] | FL | cMax = 3 |

In the above-described example, the methods are explained on the basis of a flowchart by means of a series of steps or blocks, but the present disclosure is not limited to the order of steps, and a certain step may occur in a different order or concurrently with other steps than those described above. Further, it may be understood by a person having ordinary skill in the art that the steps shown in a flowchart is not exclusive, and that another step may be incorporated or one or more steps of the flowchart may be removed without affecting the scope of the present disclosure.

The foregoing methods according to the disclosure may be implemented as a software form, and the encoding apparatus and/or decoding apparatus according to the disclosure may be included in an apparatus for performing image processing of, for example, a TV, a computer, a smartphone, a set-top box, and a display device.

In the disclosure, when examples are embodied by a software, the forgoing methods may be embodied with modules (process, function or the like) of performing above-described functions. The modules may be stored in a memory and may be executed by a processor. The memory may be inside or outside the processor and may be connected to the processor via a well-known various means. The processor may include an application-specific integrated circuit (ASIC), a different chipset, a logic circuit, and/or a data processor. The memory may include a read-only memory (ROM), a random access memory (RAM), a flash memory, a memory card, a storage medium, and/or another storage device. That is, examples described in the present disclosure may be embodied and performed on a processor, a microprocessor, a controller or a chip. For example, function units shown in each drawing may be embodied and performed on a processor, a microprocessor, a controller or a chip. In this case, information or algorithm for embodying (e.g., information on instruction) may be stored in a digital storage medium.

Further, the decoding apparatus and the encoding apparatus to which the present disclosure is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an internet streaming service providing device, a three-dimensional (3D) video device, a virtual reality device, an augmented reality (argument reality) device, a video telephony video device, a transportation means terminal (e.g., a vehicle (including an autonomous vehicle) terminal, an aircraft terminal, a ship terminal, etc.) and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied may be produced in the form of a program executed by a computer, and be stored in a computer-readable recording medium. Multimedia data having a data structure according to the present disclosure may be also stored in a computer-readable recording medium. The computer-readable recording medium includes all kinds of storage devices and distribution storage devices in which computer-readable data are stored. The computer-readable recording medium may include, for example, a Blu-ray Disc (BD), a Universal Serial Bus (USB), a ROM, a PROM, an EPROM, an EEPROM, a RAM, a CD-ROM, a magnetic tape, a floppy disk and an optical data storage device. Further, the computer-readable recording medium also includes media embodied in the form of a carrier wave (for example, transmission over the Internet). In addition, a bitstream generated by the encoding method may be stored in a computer-readable recording medium or transmitted through a wired or wireless communication network.

Additionally, the examples of the present disclosure may be embodied as a computer program product by program codes, and the program codes may be performed in a computer by the examples of the present disclosure. The program codes may be stored on a computer-readable carrier. other steps than those described above. Further, it may be understood by a person having ordinary skill in the art that the steps shown in a flowchart is not exclusive, and that FIG. 11 represents an example of a contents streaming system to which the disclosure of the present document may be applied.

Figure 11:
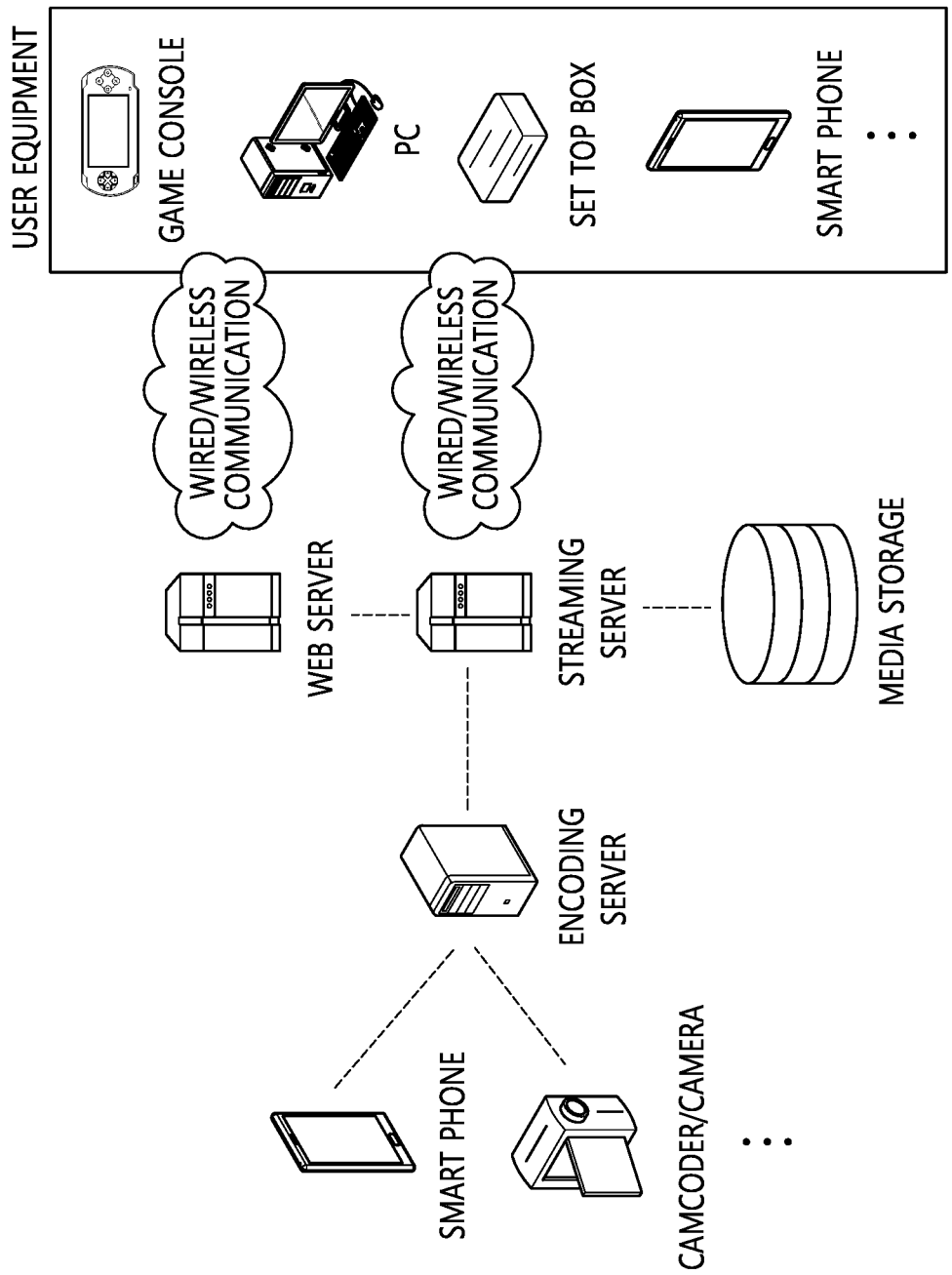
FIG. 11 represents an example of a contents streaming system to which the disclosure of the present document may be applied.

Referring to FIG. 11, the content streaming system to which the embodiment(s) of the present document is applied may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like. Each server in the content streaming system may be operated as a distributed server, in which case data received from each server may be distributed.

Each of servers in the contents streaming system may be operated as a distributed server, and in this case, data received by each server may be distributedly processed.

What is claimed is:

1. An image decoding method, by a decoding apparatus, comprising:
    deriving quantized transform coefficients for a current block based on residual information received from a bistream;
    deriving dequantized transform coefficients for the current block based on the quantized transform coefficient;
    deriving residual samples for the current block based on the dequantized transform coefficients; and
    generating a reconstructed picture based on the residual samples for the current block,
        wherein the current block includes a low frequency transform coefficient region including at least one significant transform coefficient and a region except the low frequency transform coefficient region including only transform coefficient 0,
        wherein the residual information includes last significant coefficient prefix information on position of last non-zero transform coefficient among the transform coefficients for the current block,
        wherein the last significant coefficient prefix information includes a column position prefix information and a row position prefix information,
        wherein the position of the last non-zero transform coefficient is determined based on prefix codewords related to the last significant coefficient prefix information,
        wherein the prefix codewords include a codeword for the column position prefix information and a codeword for the row position prefix information, and
        wherein a maximum value of the last significant coefficient prefix information and a maximum length of the prefix codewords are determined based on a size of the low frequency transform coefficient region.

2. The image decoding method of claim 1, wherein the size of the low frequency transform coefficient region is determined based on a width and height of the low frequency transform coefficient region.

3. The image decoding method of claim 2, wherein a maximum length of the codeword which indicates the column position prefix information and a maximum length of the codeword which indicates the row position prefix information are determined based on the maximum value of the last significant coefficient prefix information,
wherein the prefix codeword is derived based on the truncated unary binarization.

4. The image decoding method of claim 3, wherein the maximum length of the codeword are determined to be 9 based on the width of the low frequency transform coefficient region being 32, and
the maximum length of the codeword are determined to be 9 based on the height of the low frequency transform coefficient region being 32.

5. The image decoding method of claim 3, wherein a maximum binarized value of the codeword for the column position prefix information is determined to be 111111111 based on a width of the current block being greater than 32, and that the width of the low frequency transform coefficient region is 32, and
a maximum binarized value of the codeword for the row position prefix information is determined to be 111111111 based on a height of the current block being greater than 32, and that the height of the low frequency transform coefficient region is 32.

6. The image decoding method of claim 3, wherein a maximum length of the codeword for the column position prefix information is determined based on cMaxx, wherein cMaxx being calculated based on the following equation:

$$cMaxx=(\log 2(\min(W1,W2))<<1)-1$$

where cMaxx is equal to the maximum length of the codeword for the column position prefix information; the W1 is a width of the current block; and the W2 is a width of the low frequency transform coefficient region.

7. The image decoding method of claim 6, wherein a width of the low frequency transform coefficient region is 32, and
a maximum length of the codeword for the column position prefix information is determined based on cMaxx, wherein cMaxx being calculated based on the following equation:

$$cMaxx=(\min(\log 2W1,5))<<1)-1$$

where cMaxx is equal to the maximum length of the codeword for the column position prefix information, and the W1 is a width of the current block.

8. The image decoding method of claim 3, wherein a maximum length of the codeword for the row position prefix information is determined based on cMaxy, wherein cMaxy being calculated based on the following equation:

$$cMaxy=(\log 2(\min(H1,H2))<<1)-1$$

where cMaxy is equal to the maximum length of the codeword for the row position prefix information; the H1 is a height of the current block; and the H2 is a height of the low frequency transform coefficient region.

9. The image decoding method of claim 8, wherein the height of the low frequency transform coefficient is 32, and the maximum length of the codeword for the row position prefix information is determined based on cMaxy, wherein cMaxx being calculated based on the following equation:

$$cMaxy=(\min(\log 2H1,5))<<1)-1$$

where cMaxy is equal to the maximum length of the codeword for the row position prefix information, and the H1 is a height of the current block.

10. The image decoding method of claim 1, wherein the current block is a square block or a non-square block,
a width of the low frequency transform coefficient region is determined to be 32 based on a width of the current block being 64, and
a height of the low frequency transform coefficient region is determined to be 32 based on a height of the current block being 64.

11. The image decoding method of claim 1, wherein the size of the low frequency transform coefficient region is determined based on a size of the current block.

12. The image decoding method of claim 1, wherein a size of the current block is 64×64, the size of the low frequency transform coefficient region is 32×32, and a maximum length of the prefix codeword is 9.

13. An image encoding method, by an encoding apparatus, comprising:
deriving residual samples for a current block;
deriving transform coefficients for the current block based on the residual samples;
deriving quantized transform coefficients based on the transform coefficients for the current block; and
encoding residual information related with the quantized transform coefficients,
wherein the current block includes a low frequency transform coefficient region including at least one significant transform coefficient and a region except the low frequency transform coefficient region including only transform coefficient 0,
wherein the residual information includes last significant coefficient prefix information on position of a last non-zero transform coefficient among the transform coefficients for the current block,
wherein the last significant coefficient prefix information includes a column position prefix information and a row position prefix information,
wherein the position of the last non-zero transform coefficient is determined based on prefix codewords related to the last significant coefficient prefix information,
wherein the prefix codewords include a codeword for the column position prefix information and a codeword for the row position prefix information, and
wherein a maximum value of the last significant coefficient prefix information and a maximum length of the prefix codewords are determined based on a size of the low frequency transform coefficient region.

14. A non-transitory computer readable storage medium storing a bistream generated by a method, the method comprising;
deriving residual samples for a current block;
deriving transform coefficients for the current block based on the residual samples;
deriving quantized transform coefficients based on the transform coefficients for the current block; and
encoding residual information related with the quantized transform coefficients to generate the bistream, wherein the current block includes a low frequency transform coefficient region including at least one significant transform coefficient and a region except the low frequency transform coefficient region including only transform coefficient 0, wherein the residual information includes last significant coefficient prefix information on position of a last non-zero transform coefficient among the transform coefficients for the current block, wherein the last significant coefficient prefix information includes a column position prefix information and a row position prefix information, wherein the position of the last non-zero transform coefficient is determined based on prefix codewords related to the last significant coefficient prefix information, wherein the prefix codewords include a codeword for the column position prefix information and a codeword for the row position prefix information, and wherein a maximum value of the last significant coefficient prefix information and a maximum length of the prefix codewords are determined based on a size of the low frequency transform coefficient region.

* * * * *

UNITED STATES PATENT AND TRADEMARK OFFICE
CERTIFICATE OF CORRECTION

PATENT NO. : 11,659,205 B2
APPLICATION NO. : 17/537813
DATED : May 23, 2023
INVENTOR(S) : Jungah Choi et al.

Page 1 of 1

It is certified that error appears in the above-identified patent and that said Letters Patent is hereby corrected as shown below:

In the Claims

Column 45, Line 50, of Claim 7, replace "cMaxx= (Min(log2W1, 5)) << 1) -1" with --cMaxx= ((Min(log2W1, 5)) << 1) -1--.
Column 46, Line 5, of Claim 9, replace "cMaxy= (Min(log2H1, 5)) << 1) -1" with --cMaxy= ((Min(log2H1, 5)) << 1) -1--.
Column 46, Line 60, of Claim 14, replace "comprising;" with --comprising:--.

Signed and Sealed this
Eleventh Day of July, 2023

Katherine Kelly Vidal
*Director of the United States Patent and Trademark Office*